United States Patent
Kim et al.

(10) Patent No.: US 10,917,280 B2
(45) Date of Patent: Feb. 9, 2021

(54) METHOD AND APPARATUS FOR TRANSMITTING AND RECEIVING REFERENCE SIGNALS IN A WIRELESS COMMUNICATION SYSTEM

(71) Applicant: LG Electronics Inc., Seoul (KR)

(72) Inventors: Kyuseok Kim, Seoul (KR); Kilbom Lee, Seoul (KR); Jiwon Kang, Seoul (KR); Hyunsoo Ko, Seoul (KR); Kijun Kim, Seoul (KR); Seonwook Kim, Seoul (KR); Hyungtae Kim, Seoul (KR); Minki Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,398

(22) PCT Filed: Mar. 12, 2018

(86) PCT No.: PCT/KR2018/002884
§ 371 (c)(1),
(2) Date: Jul. 18, 2019

(87) PCT Pub. No.: WO2018/225936
PCT Pub. Date: Dec. 13, 2018

(65) Prior Publication Data
US 2020/0162303 A1    May 21, 2020

Related U.S. Application Data

(60) Provisional application No. 62/517,210, filed on Jun. 9, 2017.

(51) Int. Cl.
*H04L 27/26* (2006.01)
*H04L 5/00* (2006.01)
(Continued)

(52) U.S. Cl.
CPC ........ *H04L 27/2675* (2013.01); *H04L 1/0006* (2013.01); *H04L 5/005* (2013.01);
(Continued)

(58) Field of Classification Search
None
See application file for complete search history.

(56) References Cited

U.S. PATENT DOCUMENTS

2018/0367277 A1* 12/2018 Zhang ................. H04L 5/0098
2020/0008102 A1*  1/2020 Yokomakura ......... H04W 28/18

FOREIGN PATENT DOCUMENTS

| CN | 104488213 | 4/2015 |
| CN | 105122871 | 12/2015 |
| WO | 2016010379 A1 | 1/2016 |

OTHER PUBLICATIONS

Catt, "Discussion on DMRS design for DL," R1-1704561, 3GPP TSG RAN WG1 Meeting #88bis, Spokane, USA, dated Apr. 3-7, 2017, 7 pages.
(Continued)

*Primary Examiner* — Phuongchau Ba Nguyen
(74) *Attorney, Agent, or Firm* — Fish & Richardson P.C.

(57) ABSTRACT

The present invention relates to a method and a device for a terminal performing phase tracking in a wireless communication system. According to the present invention, a method and a device may be provided, the method comprising: receiving, from a base station, configuration information associated with a phase tracking reference signal (PTRS); and on the basis of the configuration information, receiving a first demodulation reference signal (DMRS) and the PTRS, wherein the PTRS is mapped to at least one OFDM symbol according to a particular pattern and at a
(Continued)

predetermined symbol interval, and phase tracking for data demodulation is performed on the basis of at least one of the first DMRS or the PTRS.

13 Claims, 24 Drawing Sheets

(51) Int. Cl.
*H04L 1/00* (2006.01)
*H04L 5/10* (2006.01)
*H04L 25/03* (2006.01)

(52) U.S. Cl.
CPC .......... *H04L 5/0007* (2013.01); *H04L 5/0051* (2013.01); *H04L 5/0082* (2013.01); *H04L 5/0094* (2013.01); *H04L 5/10* (2013.01); *H04L 25/03006* (2013.01); *H04L 27/2646* (2013.01); *H04L 2025/03796* (2013.01)

(56) References Cited

OTHER PUBLICATIONS

Catt, "Further discussion on RS for phase tracking," R1-1702088, 3GPP TSG RAN WG1 Meeting #88, Athens, Greece, dated Feb. 13-17, 2017, 5 pages.
Ericsson, "On PTRS design," R1-1703220, 3GPP TSG-RAN WG1 #88, Athens, Greece, dated Feb. 13-17, 2017, 4 pages.
Extended European Search Report in European Application No. 18813448.0, dated Feb. 19, 2020, 12 pages.
Nokia, Alcatel-Lucent Shanghai Bell, "DL DMRS patterns link performance evaluation," R1-1701104, 3GPP TSG RAN WG1 NR Ad-Hoc Meeting, Spokane, USA, dated Jan. 16-20, 2017, 11 pages.
Ericsson, "On DL and UL phase noise tracking RS (PTRS)," 'R1-1701161', 3GPP TSG-RAN WG1 #87ah-NR, Spokane, Wa, USA, Jan. 10, 2017, 11 pages.
ZTE, "Discussion on RS for phase tracking," 'R1-1707132', 3GPP TSG RAN WG1 Meeting #89, Hangzhou, CHN, May 7, 2017, 13 pages.
Ericsson, "Summary of PTRS open issues and companies views," 'R1-1707803', 3GPP TSG-RAN WG1 Meeting #89, May 17, 2017, 8 pages.
Nokia et al., "On PT-RS Design for NR," 'R1-1703182', 3GPP TSG RAN WG1 #88, Feb. 6, 2017, 7 pages.
Nokia et al., "On the DL DMRS structure for NR physical data channels," 'R1-1703180', 3GPP TSG RAN WG1 #88, Feb. 5, 2017, 7 pages.
LG Electronics, "On DL PT-RS design," 'R1-1704890', 3GPP TSG RAN WG1 Meeting #88bis, Spokane, USA Mar. 25, 2017, 5 pages.
3rd Generation Partnership Project; Technical Specification Group Radio Access Network; "Study on New Radio Access Technology (Release 14)," 3GPP TR 38.912 V0.1.0, dated Jan. 2017, 24 pages.
AT&T, "Design of DM-RS for NR MIMO," R1-1700316, 3GPP TSG RAN WG1 NR Ad-Hoc Meeting, Spokane, USA, dated Jan. 16-20, 2017, 2 pages.
Japanese Office Action in Japanese Application No. 2019-534790, dated Sep. 8, 2020, 13 pages (with English translation).
LG Electronics, "On UL PT-RS design," R1-1707617, 3GPP TSG RAN WG1 Meeting #89, Hangzhou, P.R. China, dated May 15-19, 2017, 8 pages.
Qualcomm Incorporated, "Discussion on DL DMRS design," R1-1705591, 3GPP TSG RAN WG1 #88bis, Spokane, USA, dated Apr. 3-7, 2017, 10 pages.
Ericsson, "On transmission parameter sets," R1-1708675, 3GPP TSG-RAN WG1 #89, Hangzhou, China, dated May 15-19, 2017, 4 pages.
European Office Action in European Application No. 18813448.0, dated Oct. 22, 2020, 10 pages.
Chinese Office Action in Chinese Appln. No. 20188002993.2, dated Dec. 2, 2020, 18 pages (with English translation).

\* cited by examiner (a)

(b)

(a)

(b)

(a)

(b)

(a)        (b)

(a)

(b)

METHOD AND APPARATUS FOR TRANSMITTING AND RECEIVING REFERENCE SIGNALS IN A WIRELESS COMMUNICATION SYSTEM

CROSS-REFERENCE TO RELATED APPLICATIONS

This application is a National Stage application under 35 U.S.C. § 371 of International Application No. PCT/KR2018/002884, filed on Mar. 12, 2018, which claims the benefit of U.S. Provisional Application No. 62/517,210, filed on Jun. 9, 2017. The disclosures of the prior applications are incorporated by reference in their entirety.

TECHNICAL FIELD

The present invention relates to a wireless communication system and, more particularly, to a method of generating a signal for estimating phase noise and transmitting the signal in a wireless communication system and an apparatus therefor.

BACKGROUND ART

A mobile communication system has been developed to provide voice services while ensuring the activity of a user. However, the mobile communication system has been expanded to its region up to data services in addition to the voice. Today, the shortage of resources is caused due to an explosive increase of traffic, and thus there is a need for a more advanced mobile communication system because users require higher speed services.

Requirements for a next-generation mobile communication system basically include the accommodation of explosive data traffic, a significant increase of a transfer rate per user, the accommodation of the significantly increased number of connection devices, very low end-to-end latency, and high energy efficiency. To this end, research is carried out on various technologies, such as dual connectivity, massive multiple input multiple output (MIMO), in-band full duplex, non-orthogonal multiple access (NOMA), super broadband support, and device networking.

DISCLOSURE

Technical Problem

An object of the present invention is to provide a method and apparatus for transmitting and receiving reference signals for estimating phase noise.

Furthermore, an object of the present invention is to provide method and apparatus for mapping a phase tracking reference signal (PTRS) for estimating phase noise to a resource region.

Furthermore, an object of the present invention is to provide a method and apparatus for mapping a PTRS to a resource region based on the position of a physical downlink control channel (PDCCH) or a physical uplink control channel (PUCCH).

Furthermore, an object of the present invention is to provide a method and apparatus for mapping a PTRS to a resource region based on the position of a physical downlink shared channel (PDSCH) or a physical uplink shared channel (PUSCH).

Furthermore, an object of the present invention is to provide a method and apparatus for mapping a PTRS to a resource region depending on whether a demodulation reference signal (DMRS) is mapped.

Furthermore, an object of the present invention is to provide a method and apparatus for estimating a common phase error (CPE)/carrier frequency offset (CFO) value using a PTRS.

Technical objects to be achieved in this specification are not limited to the above-described technical objects, and other technical objects not described above may be evidently understood by a person having ordinary skill in the art to which the present invention pertains from the following description.

Technical Solution

A method of performing phase tracking by a user equipment in a wireless communication system according to an embodiment of the present invention includes receiving, from a base station, configuration information related to a phase tracking reference signal (PTRS); receiving a first demodulation reference signal (DMRS) and the phase tracking reference signal based on the configuration information, the phase tracking reference signal being mapped to at least one OFDM symbol at given symbol intervals based on a specific pattern; and performing the phase tracking for demodulation of data based on at least one of the first demodulation reference signal or the phase tracking reference signal.

Furthermore, in this present invention, the phase tracking reference signal is mapped based on first priority OFDM symbol among a plurality of OFDM symbols in which the data is transmitted.

Furthermore, in this present invention, when the first demodulation reference signal is mapped to two OFDM symbols, the phase tracking reference signal is mapped based on one of the two OFDM symbols.

Furthermore, in this present invention, when a second demodulation reference signal is mapped to an OFDM symbol, the phase tracking reference signal is mapped to an OFDM symbol except an OFDM symbol to which the second demodulation reference signal has been mapped among the at least one OFDM symbol.

Furthermore, in this present invention, when the second demodulation reference signal is mapped to a specific number of OFDM symbols or less, the phase tracking reference signal is mapped to the at least one OFDM symbol.

Furthermore, in this present invention, when a first OFDM symbol to which the data is mapped is positioned ahead of a second symbol to which the first demodulation reference signal is mapped, the phase tracking reference signal is mapped based on the first OFDM symbol.

Furthermore, in this present invention, when a first OFDM symbol to which the data is mapped is positioned ahead of a second OFDM symbol to which the first demodulation reference signal is mapped, the phase tracking reference signal is mapped to an OFDM symbol after the second OFDM symbol among the at least one OFDM symbol.

Furthermore, in this present invention, the configuration information comprises at least one of an indicator indicating whether the phase tracking reference signal has been configured, first mapping pattern information indicating a time-axis mapping pattern of the phase tracking reference signal or second mapping pattern information indicating a frequency-axis mapping pattern of the phase tracking reference signal.

Furthermore, in this present invention, when a first OFDM symbol to which the first demodulation reference signal is mapped is positioned ahead of a second OFDM symbol to which a second demodulation reference signal is mapped on a time axis, the phase tracking reference signal is mapped based on the first OFDM symbol in symbols positioned between the first OFDM symbol and the second OFDM symbol, and is mapped based on the second OFDM symbol in symbols positioned after the second OFDM symbol.

Furthermore, the present invention provides a user equipment performing phase tracking in a wireless communication system, including a communication unit transmitting and receiving radio signals to and from an outside and a processor functionally coupled to the communication unit, wherein the processor is configured to receive, from a base station, configuration information related to a phase tracking reference signal (PTRS); receive a first demodulation reference signal (DMRS) and the phase tracking reference signal based on the configuration information, the phase tracking reference signal being mapped to at least one OFDM symbol at given symbol intervals based on a specific pattern; and perform the phase tracking for demodulation of data based on at least one of the first demodulation reference signal or the phase tracking reference signal.

Advantageous Effects

The present invention has an effect in that it can compensate for phase noise by estimating a common phase error (CPE) and a carrier frequency offset (CFO) value through a PTRS.

Furthermore, the present invention has an effect in that it can reduce RS overhead and improve throughput performance by not mapping a PTRS to a symbol when a DMRS is mapped to a specific number of symbols or more.

Furthermore, the present invention has an effect in that it can map a PTRS flexibly depending on the situation of a user equipment because the PTRS is mapped based on a symbol to which data, control information or a reference signal is mapped.

Effects which may be obtained this specification are not limited to the above-described effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

MODE FOR INVENTION

Figure 1:
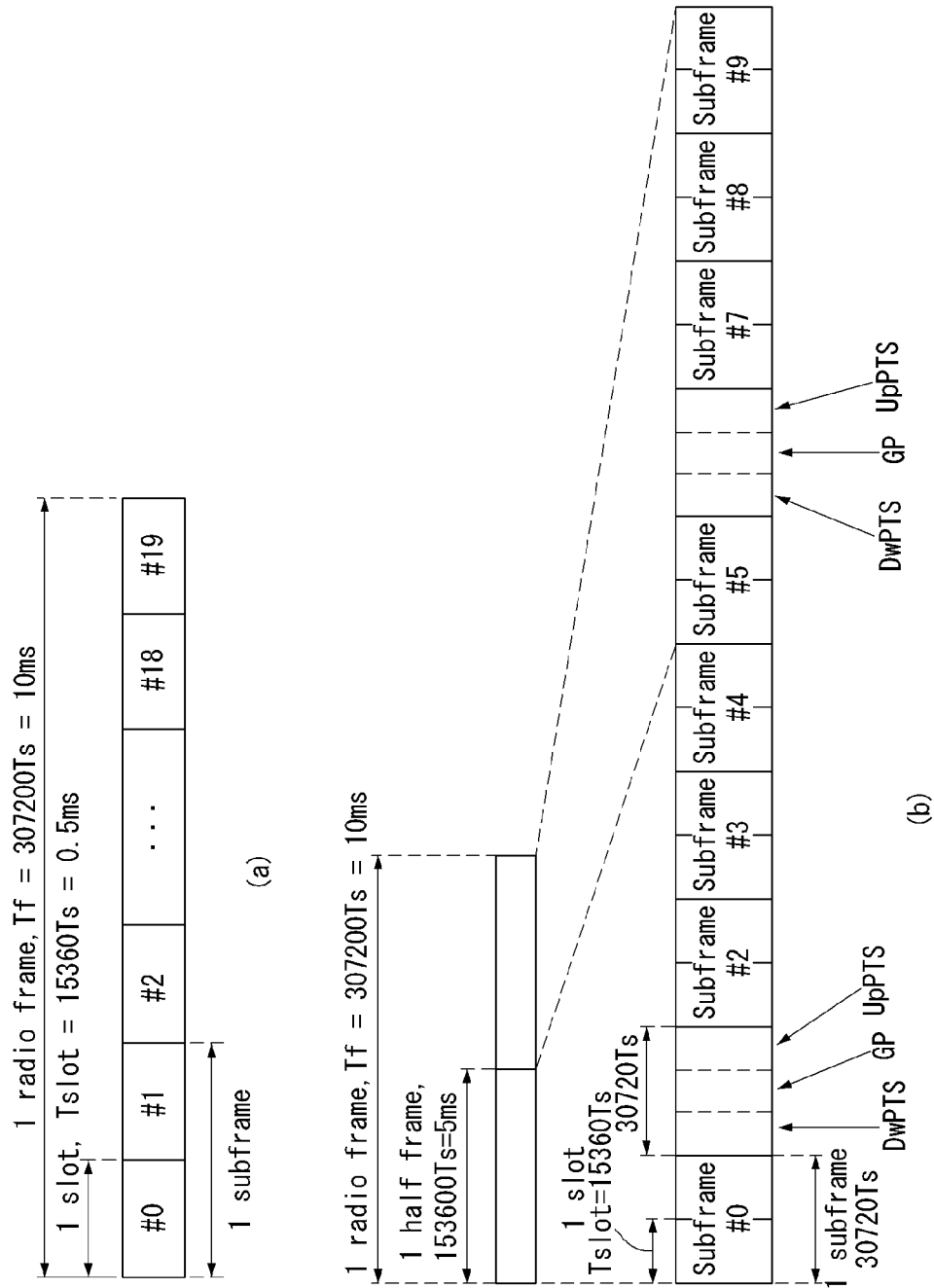
FIG. 1 is a diagram illustrating the structure of a radio frame in a wireless communication system to which the present invention may be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in a block diagram form focused on important features of the structures and devices in order to avoid making obscure the concept of the present invention.

In this specification, a base station has a meaning as a terminal node of a network, directly communicating with a terminal. In this document, a specific operation illustrated as being performed by a base station may be performed by an upper node of the base station according to circumstances. That is, it is evident that in a network including multiple network nodes including a base station, various operations performed for communication with a terminal may be performed by the base station or other network nodes other than the base station. A "base station (BS)" may be substituted with a term, such as a fixed station, a Node B, an evolved-NodeB (eNB), a base transceiver system (BTS), an access point (AP) or a transmission stage. Furthermore, a "terminal" may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a mMachine-type communication (MTC) device, a machine-to-machine (M2M) device, a device-to-device (D2D) device or a reception stage.

Hereinafter, downlink (DL) refers to communication from a base station to a UE, and uplink (UL) refers to communication from a UE to a base station. In downlink, a transmitter may be part of a base station, and a receiver may be part of a UE. In uplink, a transmitter may be part of a UE, and a receiver may be part of a base station.

Specific terms used in the following description are provided to help understanding of the present invention. The use of such specific terms may be changed in other forms without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000.

The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General Wireless Communication System to which the Present Invention May be Applied FIG. 1 shows the structure of a radio frame in a wireless communication system to which the present invention may be applied.

3GPP LTE/LTE-A supports a type 1 radio frame structure applicable to frequency division duplex (FDD) and a type 2 radio frame structure applicable to time division duplex (TDD).

In FIG. 1, the size of the radio frame in the time domain is represented as a multiple of a time unit of $T\_s=1/(15000*2048)$. Downlink and uplink transmission are configured with a radio frame having a period of $T\_f=307200*T\_s=10$ ms.

FIG. 1(a) illustrates the structure of the type 1 radio frame. The Type 1 radio frame may be applied to both full duplex and half duplex FDD.

The radio frame includes 10 subframes. One radio frame includes 20 slots of $T\_slot=15360*T\_s=0.5$ ms length. The slots are assigned indices from 0 to 19. One subframe includes contiguous 2 slots in the time domain, and a subframe i includes a slot 2i and a slot 2i+1. The time taken to transmit one subframe is called a transmission time period (TTI). For example, the length of one subframe may be 1 ms, and the length of one slot may be 0.5 ms.

In FDD, uplink transmission and downlink transmission are divided in the frequency domain. There is no limit to full duplex FDD, whereas a user equipment cannot perform transmission and reception at the same time in a half duplex FDD operation.

One slot includes a plurality of orthogonal frequency division multiplexing (OFDM) symbols in the time domain and includes multiple resource blocks (RBs) in the frequency domain. 3GPP LTE uses OFDMA in downlink, and thus an OFDM symbol is for representing one symbol period. An OFDM symbol may be called one SC-FDMA symbol or symbol period. A resource block is a resource allocation unit, and includes a plurality of contiguous subcarriers in one slot.

FIG. 1(b) shows the frame structure type 2.

A type 2 radio frame includes 2 half frames, each one having a length of $153600*T\_s=5$ ms. Each half frame includes 5 subframes having a length of $30720*T\_s=1$ ms.

In the frame structure type 2 of a TDD system, an uplink-downlink configuration is a rule indicating whether uplink and downlink are allocated (or reserved) with respect to all subframes.

Table 1 shows an uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In all configurations, Nos. 0 and 5 subframe and a DwPTS are an interval for only downlink transmission. An UpPTS and a subframe subsequent to a subframe is always an interval for uplink transmission.

Such an uplink-downlink configuration is system information and may be known to both a base station and a user equipment. The base station may notify the user equipment of a change in the uplink-downlink allocation state of a radio frame by transmitting only the index of configuration information whenever uplink-downlink configuration information is changed. Furthermore, the configuration information is a kind of downlink control information and may be transmitted through a physical downlink control channel (PDCCH) like other scheduling information. The configuration information is broadcast information and may be transmitted to all user equipments within a cell in common through a broadcast channel.

Table 2 shows the configuration of a special subframe (the length of DwPTS/GP/UpPTS).

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | | Normal cyclic prefix in uplink | Extended cyclic prefix in uplink | DwPTS | Normal cyclic prefix in uplink | Extended cyclic prefix in uplink |
| 0 | $6592 \cdot T_s$  | | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ | |                  |                  | $20480 \cdot T_s$ |                  |                  |
| 2 | $21952 \cdot T_s$ | |                  |                  | $23040 \cdot T_s$ |                  |                  |
| 3 | $24144 \cdot T_s$ | |                  |                  | $25600 \cdot T_s$ |                  |                  |
| 4 | $26336 \cdot T_s$ | |                  |                  | $7680 \cdot T_s$  | $4384 \cdot T_s$ | $5120 \cdot T_s$ |
| 5 | $6592 \cdot T_s$  | | $4384 \cdot T_s$ | $5120 \cdot T_s$ | $20480 \cdot T_s$ |                  |                  |
| 6 | $19760 \cdot T_s$ | |                  |                  | $23040 \cdot T_s$ |                  |                  |
| 7 | $21952 \cdot T_s$ | |                  |                  | —                 | —                | —                |
| 8 | $24144 \cdot T_s$ | |                  |                  | —                 | —                | —                |

Referring to Table 1, for each subframe of a radio frame, "D" indicates a subframe for downlink transmission, "U" is a subframe for uplink transmission, and "S" indicates a special subframe including three fields of a downlink pilot time slot (DwPTS), a guard period (GP), and an uplink pilot time slot (UpPTS).

The DwPTS is used for initial cell search, synchronization or channel estimation in a user equipment. The UpPTS is used to perform channel estimation in a base station and uplink transmission synchronization for a user equipment. The GP is a period for removing interference occurring in uplink due to the multi-path delay of a downlink signal between uplink and downlink.

Each subframe i includes a slot 2i and a slot 2i+1, each one having a length of T_slot=15360*T_s=0.5 ms.

An uplink-downlink configuration may be divided into 7 types. The position and/or number of downlink subframes, special subframes, uplink subframes are different for each configuration.

A point of time switching from the downlink to the uplink or a point of time switching from the uplink to the downlink is called a switching point. Switching point periodicity means the period in which an aspect in which an uplink subframe and a downlink subframe switch is identically repeated, and supports both 5 ms and 10 ms. In the case of the 5 ms downlink-uplink switching point periodicity, a special subframe S is present in each half-frame. In the case of the 5 ms downlink-uplink switching point periodicity, a special subframe S is present only in the first half-frame.

The structure of the radio frame according to the example of FIG. 1 is merely one example, and the number of subcarriers included in the radio frame or the number of slots included in a subframe or the number of OFDM symbols included in a slot may be changed in various manners.

Figure 2:
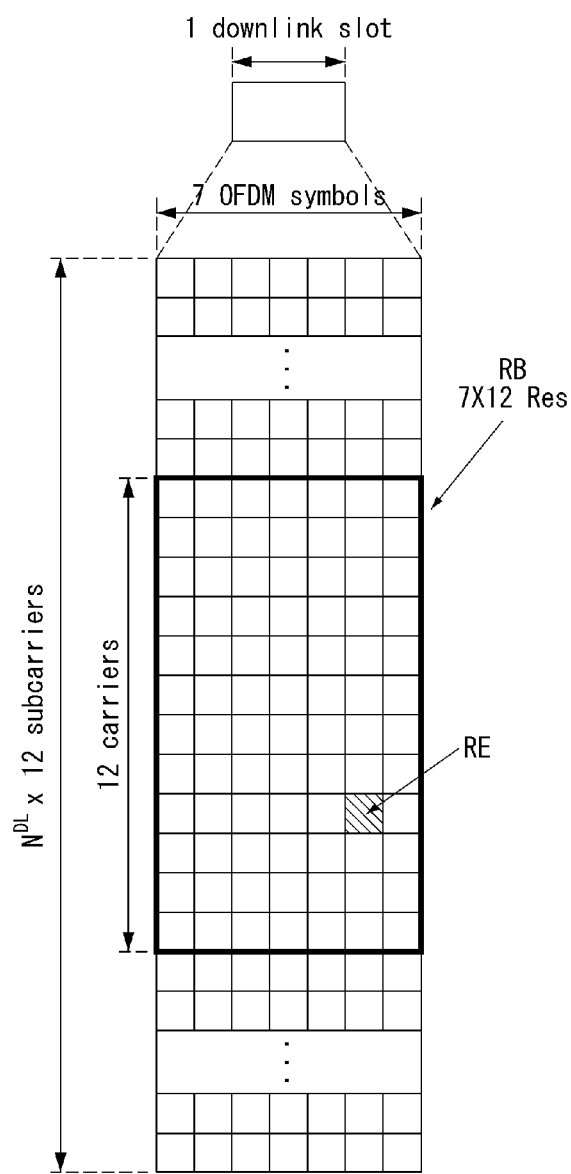
FIG. 2 is a diagram illustrating a resource grid for a downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, N^ADL is subordinated to a downlink transmission bandwidth.

A structure of the uplink slot may be the same as that of the downlink slot.

Figure 3:
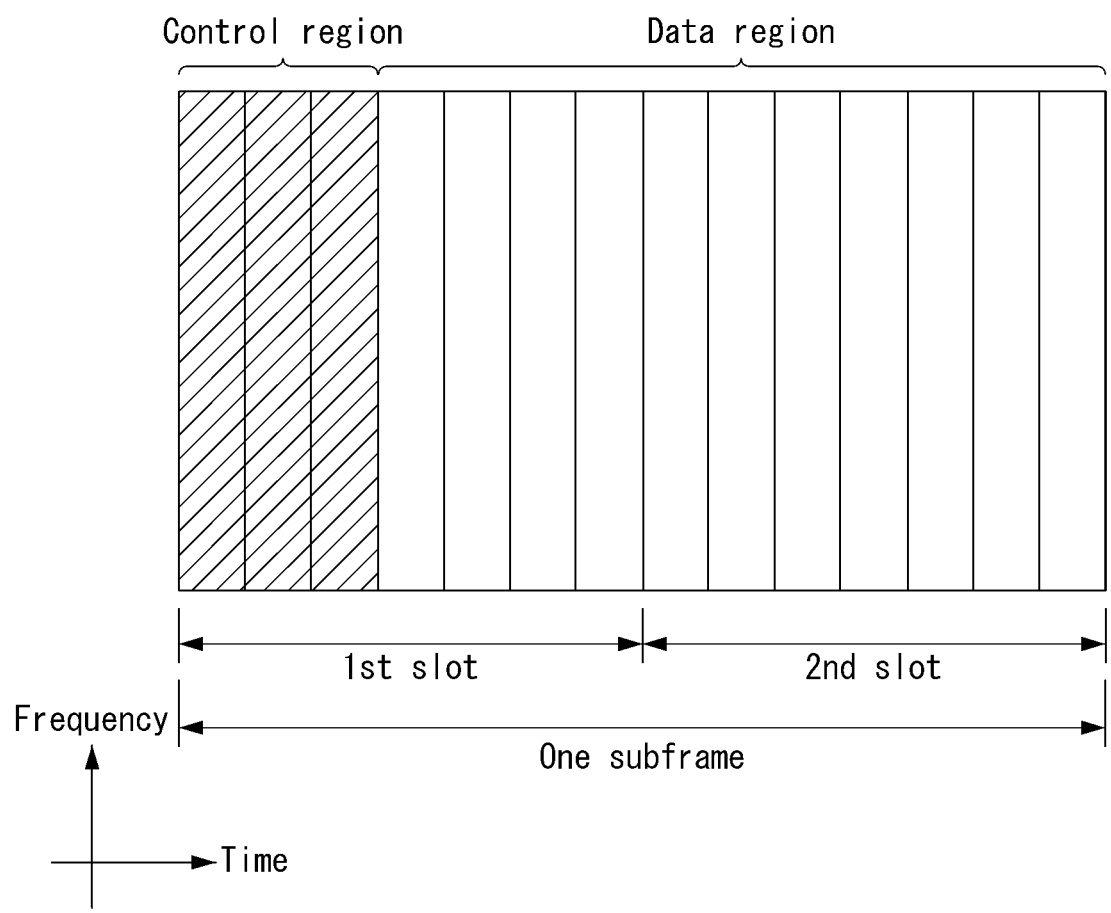
FIG. 3 is a diagram illustrating a structure of downlink subframe in a wireless communication system to which the present invention may be applied.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PCFICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

PDCCH (Physical Downlink Control Channel)

Hereinafter, a PDCCH will be described in detail.

The control information transmitted via the PDCCH is referred to as downlink control information (DCI). The size and use of control information transmitted via the PDCCH may be changed according to DCI format or the size of control information may be changed according to coding rate.

Table 3 shows the DCI according to DCI format

TABLE 3

| PUCCH Format | Uplink Control Information(UCI) |
|---|---|
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1-or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Referring to Table 3 above, the DCI format includes format 0 for scheduling of a PUSCH, format 1 for scheduling of one PDSCH codeword, format 1A for compact scheduling of one PDSCH codeword, format 1c for very compact scheduling of a DL-SCH, format 2 for PDSCH scheduling in a closed-loop spatial multiplexing mode, format 2A for PDSCH scheduling in an open-loop spatial multiplexing mode, formats 3 and 3A for transmission of a transmission power control (TPC) command for an uplink channel, and format 4 for PUSCH scheduling in a uplink cell in a multiple antenna port transmission mode.

DCI format 1A may be used for PDSCH scheduling regardless of the transmission mode of the UE.

Such DCI format is independently applicable per UE and PDCCHs of several UEs may be multiplexed within one subframe. The PDCCH is composed of an aggregate of one or several control channel elements (CCEs). The CCE is a logical allocation unit used to provide a PDCCH with a coding rate according to radio channel state. The CCE refers to a unit corresponding to 9 sets of REGs composed of four resource elements. The BS may use {1, 2, 4, 8} CCEs in order to configure one PDCCH signal and {1, 2, 4, 8} is referred to as a CCE aggregation level.

The number of CCEs used to transmit a specific PDCCH is determined by the BS according to channel state. The PDCCH configured according to UE is interleaved and mapped to a control channel region of each subframe by a CCE-to-RE mapping rule. The location of the PDCCH may depend on the number of OFDM symbols for a control channel of each subframe, the number of PHICH groups, transmit antenna, frequency shift, etc.

As described above, channel coding is performed independent of the multiplexed PDCCHs of the UEs and cyclic redundancy check (CRC) is applied. A unique identifier (UE ID) of each UE is masked to the CRC such that the UE receives the PDCCH thereof. However, in the control region allocated within the subframe, the BS does not provide the UE with information about where the PDCCH of the UE is located. Since the UE does not know the location of the PDCCH thereof and at which CCE aggregation level or with which DCI format the PDCCH thereof is transmitted, the UE monitors a set of PDCCH candidates within the subframe to detect the PDCCH thereof, in order to receive the control channel from the BS. This is referred to as blind decoding (BD).

The BD may also be referred to as blind detection or blind detect. The BD refers to a method of, at a UE, de-masking a UE ID thereof in a CRC portion, checking CRC errors, and determining whether a PDCCH is a control channel thereof.

Hereinafter, the information transmitted by DCI format 0 will be described.

DCI format 0 is used for PUSCH scheduling in one uplink cell.

Table 4 represents the information transmitted through DCI format 0

TABLE 4

| Format 0 (Release 8) | Format 0 (Release 10) |
|---|---|
|  | Carrier Indicator (CIF) |
| Flag for format 0/format 1A differentiation | Flag for format 0/format 1A differentiation |
| Hopping flag (FH) | Hopping flag (FH) |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic shift for DM RS | Cyclic shift for DM RS |
| UL index (TDD only) | UL index (TDD only) |
| Downlink Assignment Index (DAI) | Downlink Assignment Index (DAI) |
| CSI request (1 bit) | CSI request (1 or 2 bits: 2 bit is for multi carrier) |
|  | SRS request |
|  | Resource allocation type (RAT) |

Referring to Table 4 above, the following information is transmitted through DCI format 0.

Referring to Table 4 above, the following information is transmitted through DCI format 0.

1) Carrier indicator, which has a length of 0 or 3 bits.

2) Flag for DCI format 0 and DCI format 1A differentiation, which has a length of 1 bit, and 0 indicates DCI format 0 and 1 indicates DCI format 1A 3) Frequency hopping flag, which has 1 bit. This field may used for the multi-cluster allocation for the Most Significant bit (MSB) of the corresponding resource allocation if it is required.

4) Resource block assignment and hopping resource allocation, which has $\lceil \log_2(N_{RB}^{DL}(N_{RB}^{DL}+1)/2) \rceil$ bit.

Herein, in the case of PUSCH hopping in a single-cluster allocation, in order to acquire the value of $ñ_{PRB}(i)$, the most significant bits (MSBs) of NUL_hop number are used. $(\lceil \log_2(N_{RB}^{UL}(N_{RB}^{UL}+1)/2) \rceil - N_{UL\_hop})$ bit provides the resource allocation of the first slot in the uplink subframe. In addition, in the case that there is no PUSCH hopping in the single-cluster allocation, $(\lceil \log_2(N_{RB}^{UL}(N_{RB}^{UL}+1)/2) \rceil)$ bit provides the resource allocation in the uplink subframe. In addition, in the case that there is no PUSCH hopping in a multi-cluster allocation, the resource allocation information is obtained from the concatenation between the frequency hopping flag field and the hopping resource allocation field of the resource block allocation, and $(\lceil \log_2(N_{RB}^{UL}(N_{RB}^{UL}+1)/2) \rceil)$ bit provides the resource allocation in the uplink subframe. In this case, value of P is determined by the number of downlink resource blocks.

5) Modulation and coding scheme (MCS), which has a length of 1 bit.

6) New data indicator, which has a length of 2 bits.

7) Transmit Power Control (TPC) command for PUSCH, which has a length of 2 bits.

8) Cyclic shift (CS) for a demodulation reference signal (DMRS) and an index of orthogonal cover/orthogonal cover code (OC/OCC), which has 3 bits.

9) Uplink index, which has a length of 2 bits. This field exits only for the TDD operation according to uplink-downlink configuration 0.

10) Downlink Assignment Index (DAI), which has a length of 2 bits. This field exits only for the TDD operation according to uplink-downlink configurations 1-6.

11) Channel State Information (CSI) request, which has a length of 1 bit or 2 bits. Herein, the field of 2 bits is applied only to the case that the corresponding DCI is mapped to the UE to which one or more downlink cells are configured by the Cell-RNTI (C-RNTI) in a UE-specific manner.

12) Sounding Reference Signal (SRS) request, which has a length of 0 bit or 1 bit. Herein, this field exists only in the case that the scheduling PUSCH is mapped by the C-RNTI in the UE-specific manner.

13) Resource allocation type, which has a length of 1 bit.

In the case that the number of information bits in DCI format 0 is smaller than the payload size (including additional padding bits) of DCI format 1A, 0 is added in order that DCI format 1A becomes identical to DCI format 0.

Figure 4:
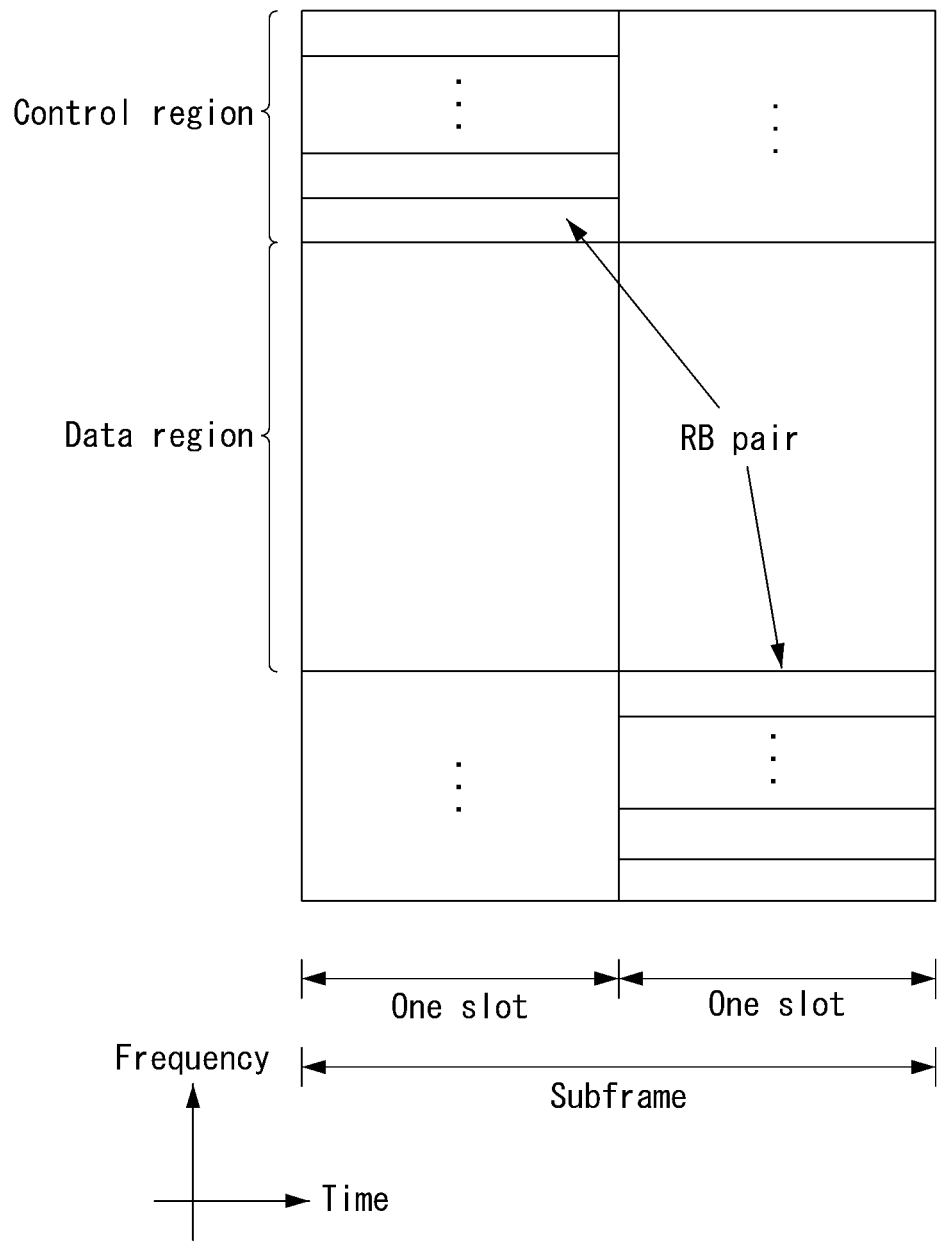
FIG. 4 is a diagram illustrating a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 5 given below predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

Figure 5:
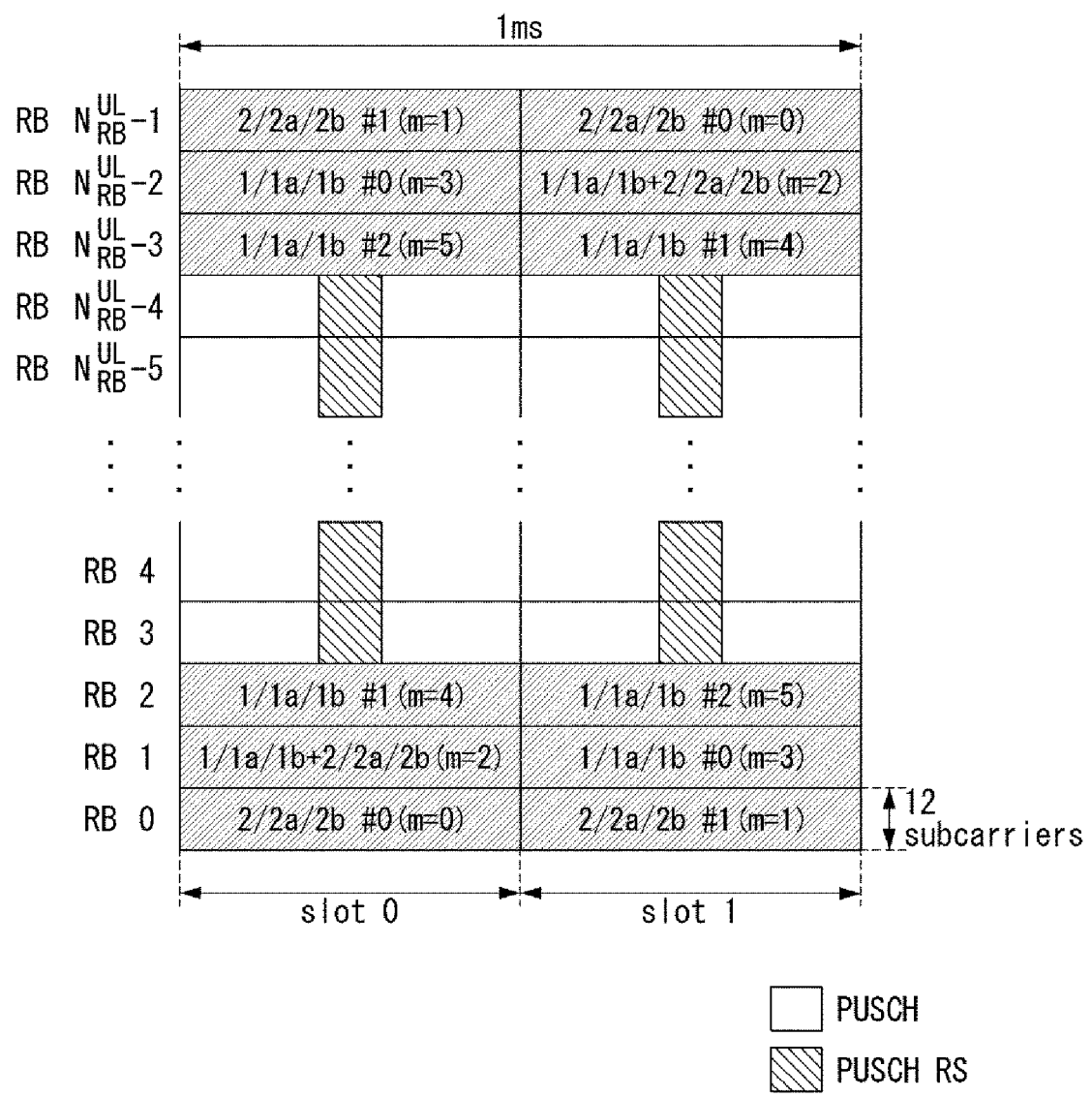
FIG. 5 is a diagram illustrating an example of the shape in which PUCCH formats are mapped to the PUCCH region of uplink physical resource block in a wireless communication system to which the present invention may be applied.

FIG. 5 a diagram illustrating one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixed and mapped to a PUCCH region expressed as m=2. Next, PUCCH format 1/1a/1b may be mapped to a PUCCH region expressed as m=3, 4, and 5. The number $(N_{RB}^{(2)})$ of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
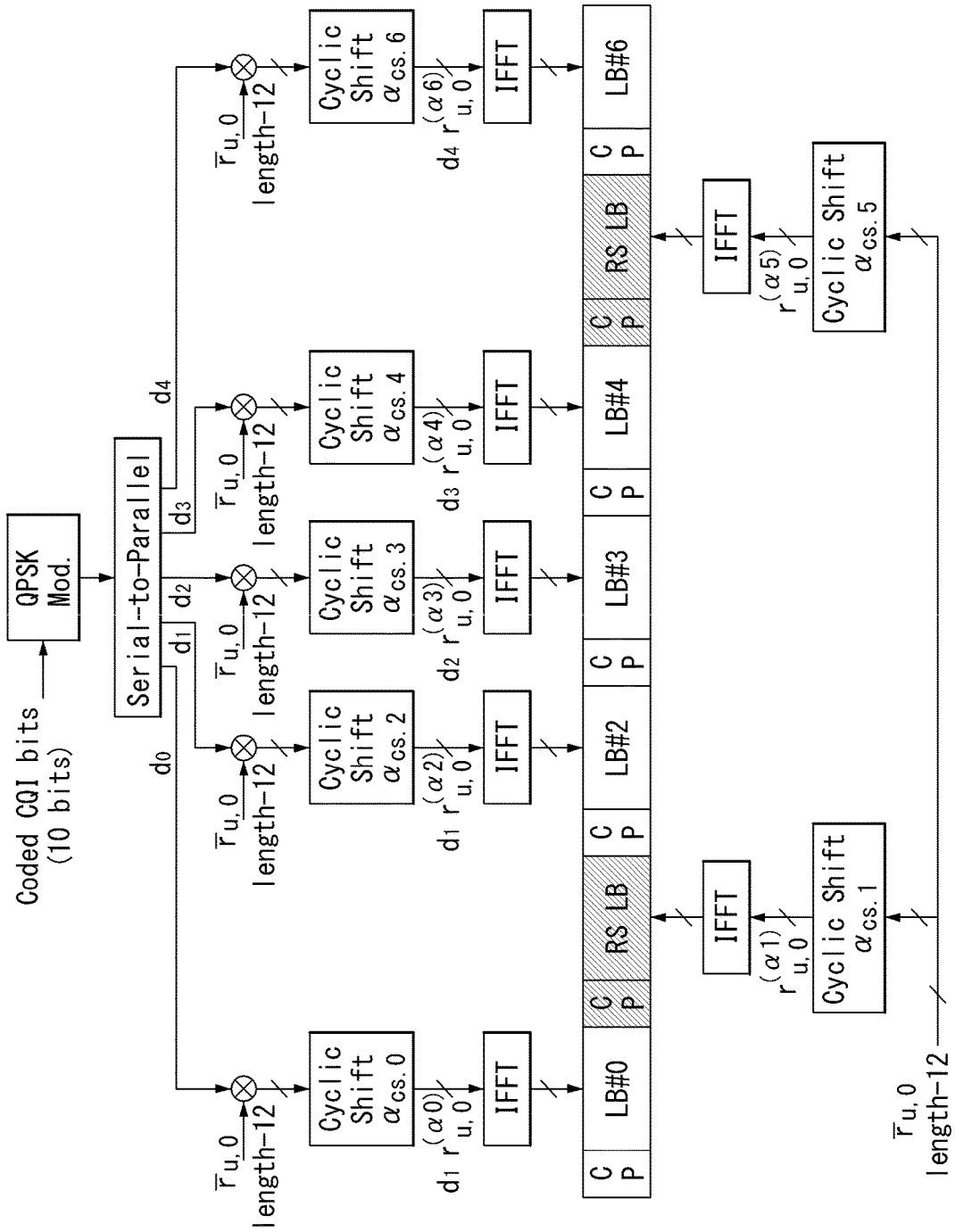
FIG. 6 is a diagram illustrating a structure of CQI channel in the case of normal CP in a wireless communication system to which the present invention may be applied.

FIG. 6 illustrates a structure of a CQI channel in the case of a general CP in the wireless communication system to which the present invention can be applied.

TABLE 5

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1-or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, ..., N−1) having a length of N becomes y(0), y(1), y(2), ..., y(N−1). y(0), ..., y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

Figure 7:
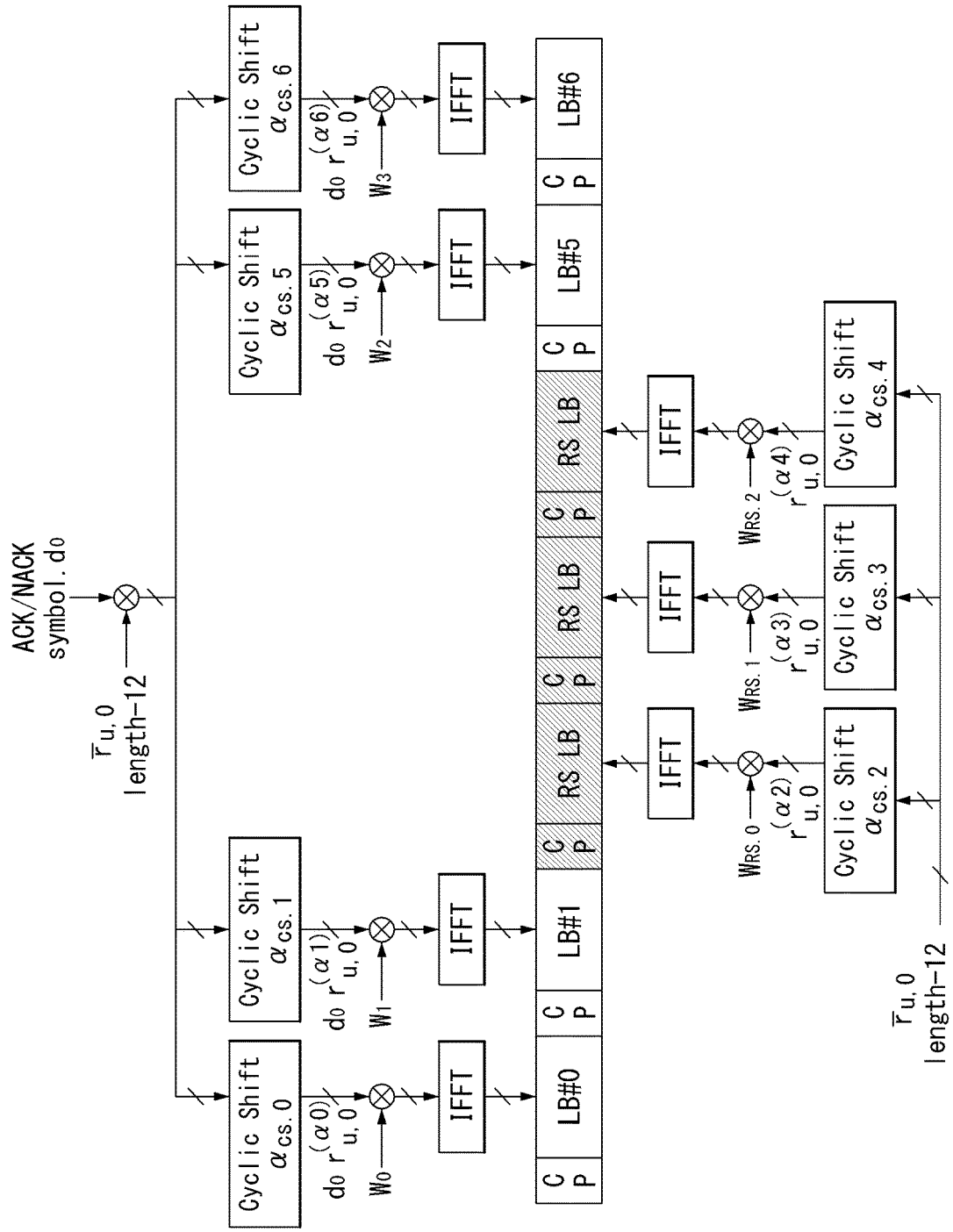
FIG. 7 is a diagram illustrating a structure of ACK/NACK channel in the case of normal CP in a wireless communication system to which the present invention may be applied.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

Figure 8:
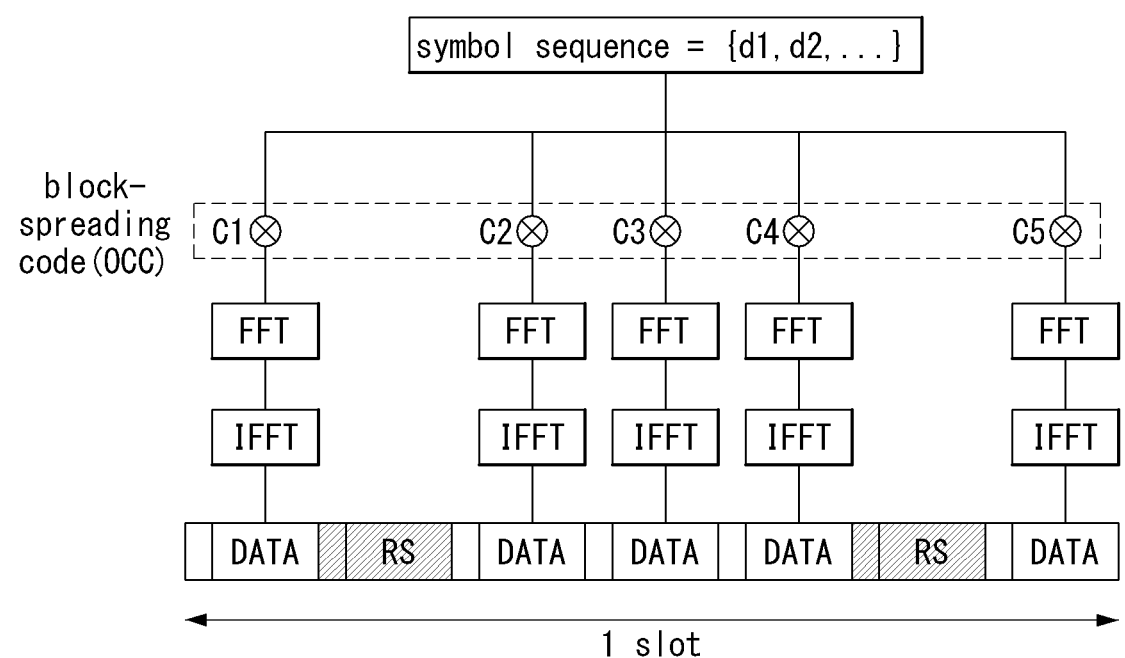
FIG. 8 is a diagram illustrating an example of generating and transmitting five SC-FDMA symbols during a slot in a wireless communication system to which the present invention may be applied.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present invention can be applied.

In FIG. 8, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be interchangeably used with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 9:
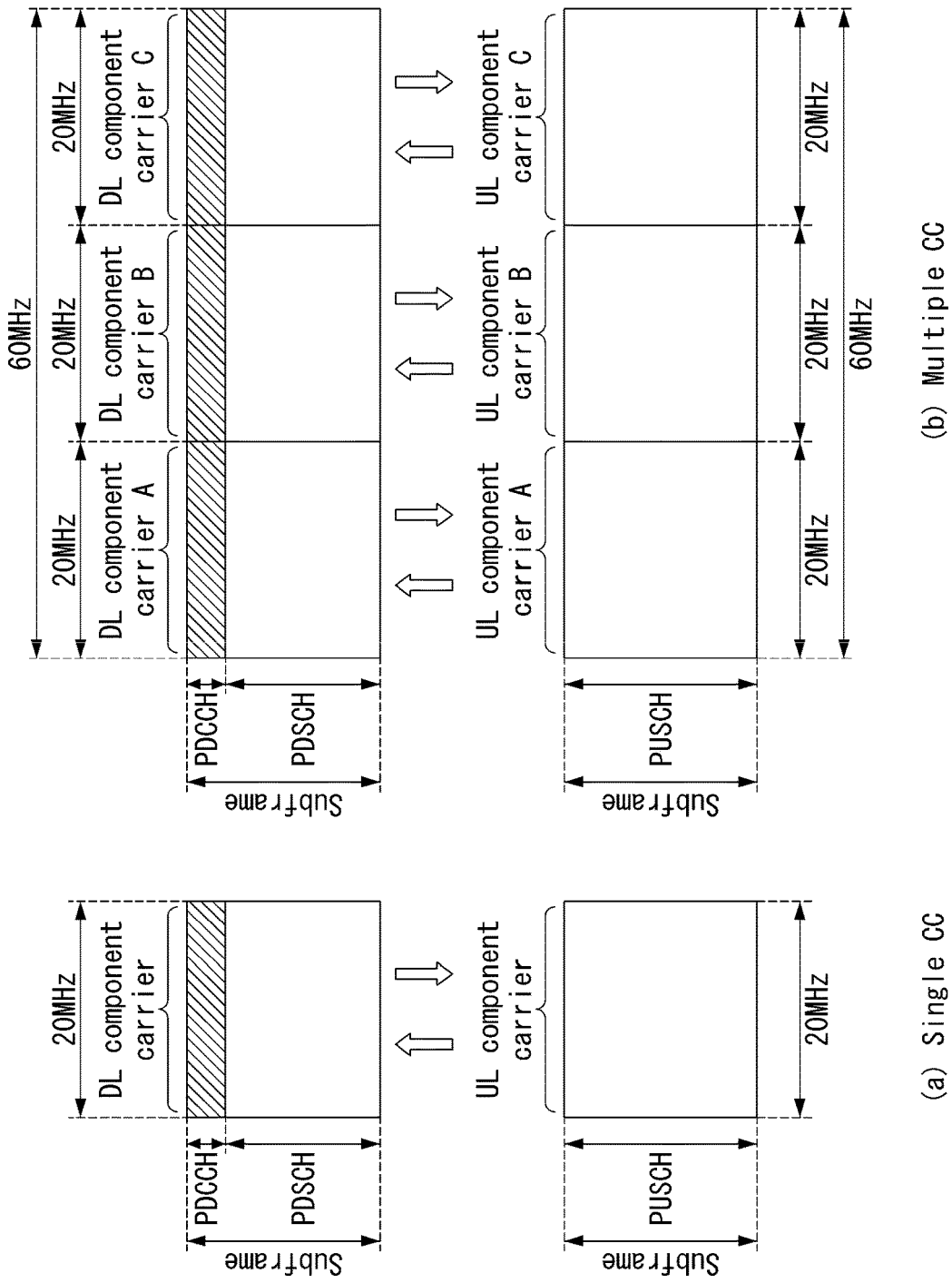
FIG. 9 is a diagram illustrating an example of a component carrier and a carrier aggregation in a wireless communication system to which the present invention may be applied.

FIG. 9 a diagram illustrating examples of a component carrier and carrier aggregation in the wireless communication system to which the present invention can be applied.

FIG. 9a illustrates a single carrier structure used in an LTE system. The component carrier includes the DL CC and the UL CC. One component carrier may have a frequency range of 20 MHz.

FIG. 9b illustrates a carrier aggregation structure used in the LTE system. In the case of FIG. 9b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

Figure 10:
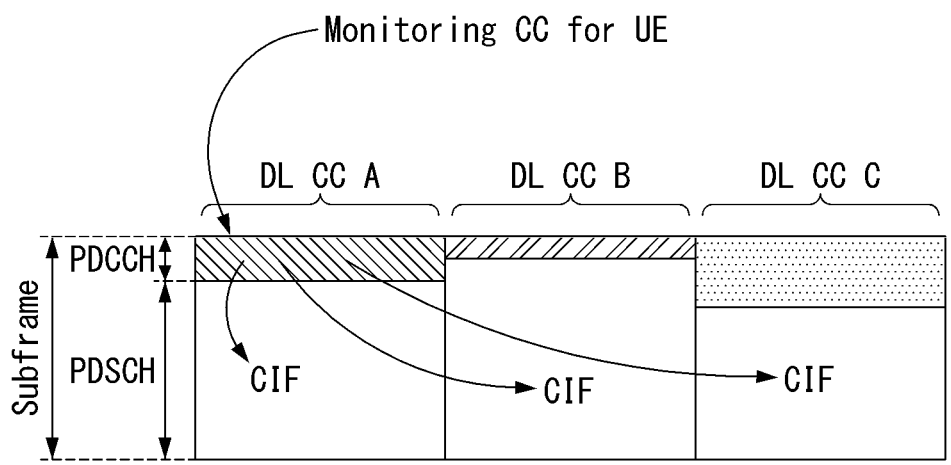
FIG. 10 is a diagram illustrating an example of a subframe structure according to cross carrier scheduling in a wireless communication system to which the present invention may be applied.

FIG. 10 a diagram illustrating one example of a subframe structure depending on cross carrier scheduling in the wireless communication system to which the present invention can be applied.

Referring to FIG. 10, a case is illustrated, in which three DL CCs are associated with a DL subframe for an LTE-A terminal and DL CC 'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

General ACK/NACK Multiplexing Method

In a situation in which the terminal simultaneously needs to transmit multiple ACKs/NACKs corresponding to multiple data units received from an eNB, an ACK/NACK multiplexing method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 6 given below.

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 6 given above, HARQ-ACK(i) represents an ACK/NACK result for an i-th data unit. In Table 3 given above, discontinuous transmission (DTX) means that there is no data unit to be transmitted for the corresponding HARQ-ACK(i) or that the terminal may not detect the data unit corresponding to the HARQ-ACK(i).

According to Table 5 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$.

When the terminal fails in decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Validation of PDCCH for Semi-Persistent Scheduling

Semi-persistent scheduling (SPS) is a scheduling scheme that allocates the resource to the terminal to be persistently maintained during a specific time interval.

When a predetermined amount of data is transmitted for a specific time like a voice over Internet protocol (VoIP), since the control information need not be transmitted every data transmission interval for the resource allocation, the waste of the control information may be reduced by using the SPS scheme. In a so-called semi-persistent scheduling (SPS) method, a time resource domain in which the resource may be allocated to the terminal is preferentially allocated.

In this case, in a semi-persistent allocation method, a time resource domain allocated to a specific terminal may be configured to have periodicity. Then, a frequency resource domain is allocated as necessary to complete allocation of the time-frequency resource. Allocating the frequency resource domain may be designated as so-called activation. When the semi-persistent allocation method is used, since the resource allocation is maintained during a predetermined period by one-time signaling, the resource need not be repeatedly allocated, and as a result, signaling overhead may be reduced.

Thereafter, since the resource allocation to the terminal is not required, signaling for releasing the frequency resource allocation may be transmitted from the base station to the terminal. Releasing the allocation of the frequency resource domain may be designated as deactivation.

In current LTE, in which subframes the SPS is first transmitted/received through radio resource control (RRC) signaling for the SPS for the uplink and/or downlink is announced to the terminal. That is, the time resource is preferentially designated among the time and frequency resources allocated for the SPS through the RRC signaling.

Therefore, the terminal receives the PDCCH indicating the activation and thereafter, allocate the frequency resource according to RB allocation information included in the received PDCCH and applies modulation and code rate depending on modulation and coding scheme (MCS) information to start transmission and reception according to the period and the offset of the subframe allocated through the RRC signaling.

Next, when the terminal receives the PDCCH announcing the deactivation from the base station, the terminal stops transmission and reception. When the terminal receives the PDCCH indicating the activation or reactivation after stopping the transmission and reception, the terminal resumes the transmission and reception again with the period and the offset of the subframe allocated through the RRC signaling by using the RC allocation, the MCS, and the like designated by the PDCCH. That is, the time resource is performed through the RRC signaling, but the signal may be actually transmitted and received after receiving the PDCCH indicating the activation and reactivation of the SPS and the signal transmission and reception stop after receiving the PDCCH indicating the deactivation of the SPS.

When all conditions described below are satisfied, the terminal may validate a PDCCH including an SPS indication. First, a CRC parity bit added for a PDCCH payload needs to be scrambled with an SPS C-RNTI and second, a new data indicator (NDI) field needs to be set to 0. Herein, in the case of DCI formats 2, 2A, 2B, and 2C, the new data indicator field indicates one activated transmission block.

In addition, when each field used in the DCI format is set according to Tables 4 and 5 given below, the validation is completed. When the validation is completed, the terminal recognizes that received DCI information is valid SPS activation or deactivation (alternatively, release). On the contrary, when the validation is not completed, the terminal recognizes that a non-matching CRC is included in the received DCI format.

Table 7 shows a field for validating the PDCCH indicating the SPS activation.

TABLE 7

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB | is set to '0' For the enabled transport block: MSB is set to '0' |
| Redundancy version | N/A | set to '00' | For the enabled transport block: set to '00' |

In order to announce a usable subframe, for example, a period and an offset of the subframe may be announced. However, since the terminal is allocated with only the time resource domain through the RRC signaling, even though the terminal receives the RRC signaling, the terminal does not immediately perform transmission and reception by the SPS and the terminal allocates the frequency resource domain as necessary to complete the allocation of the time-frequency resource. Allocating the frequency resource domain may be designated as deactivation and releasing the allocation of the frequency resource domain may be designated as deactivation.

Table 8 shows a field for validating the PDCCH indicating the SPS deactivation (alternatively, release).

TABLE 8

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |

TABLE 8-continued

|  | DCI format 0 | DCI format 1A |
|---|---|---|
| HARQ process number | N/A | FDD: set to '000'<br>TDD: set to '0000' |
| Modulation and coding scheme | N/A | set to '11111' |
| Redundancy version | N/A | set to '00' |
| Resource block assignment | N/A | Set to all '1's |

When the DCI format indicates SPS downlink scheduling activation, a TPC command value for the PUCCH field may be used as indexes indicating four PUCCH resource values set by the upper layer.

PUCCH Piggybacking in Rel-8 LTE

Figure 11:
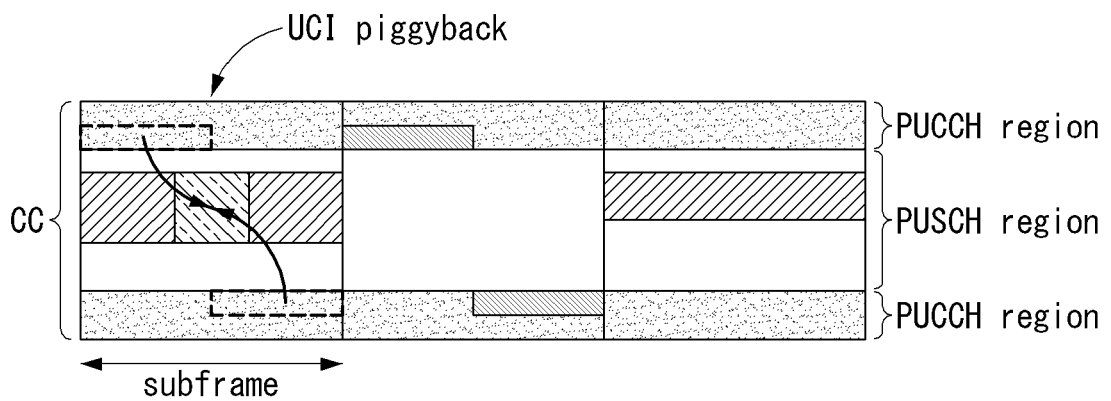
FIG. 11 is a diagram illustrating an example of transmission channel processing of UL-SCH in a wireless communication system to which the present invention may be applied.

FIG. 11 a diagram illustrating one example of transport channel processing of a UL-SCH in the wireless communication system to which the present invention can be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

Figure 12:
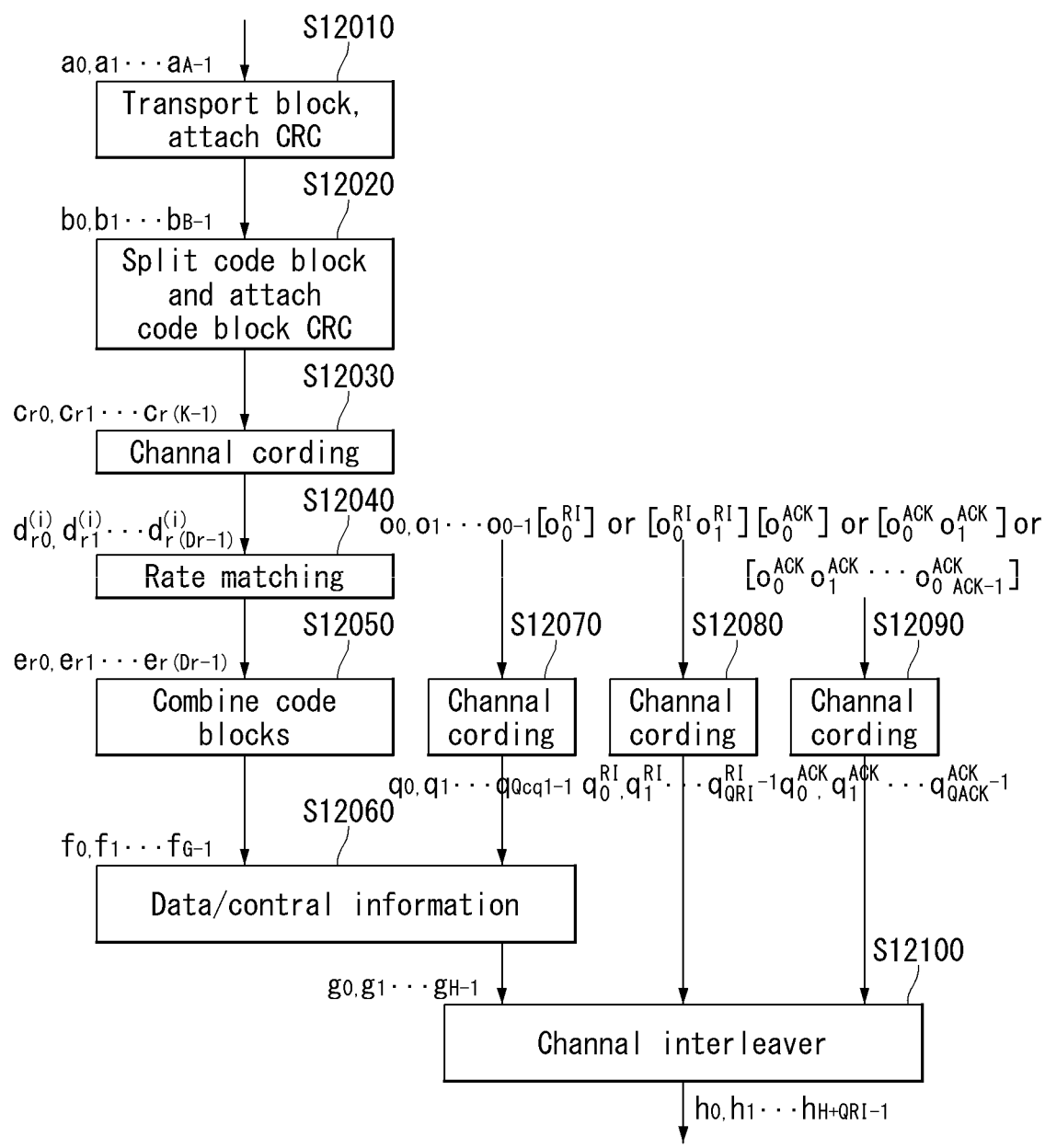
FIG. 12 is a diagram illustrating an example of a signal processing process of an uplink shared channel which is a transport channel in a wireless communication system to which the present invention may be applied.

FIG. 12 a diagram illustrating one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 12, the UL-SCH transfers data to a coding unit in the form of a transport block (TB) once every a transmission time interval (TTI).

A CRC parity bit $p_0, p_1, p_2, p_3, \ldots, p_{L-1}$ is attached to a bit of the transport block $a_0, a_1, a_2, a_3, \ldots, a_{A-1}$ received from the upper layer (S12010). In this case, A represents the size of the transport block and L represents the number of parity bits. Input bits to which the CRC is attached are shown in $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S12020). Bits after the code block segmentation and the CRC attachment are shown in $c_{r0}, c_{r1}, c_{r2}, c_{r3}, \ldots, c_{r(K_r-1)}$. Herein, represents No. ($r=0, \ldots, C-1$) of the code block and Kr represents the bit number depending on the code block r. Further, C represents the total number of code blocks.

Subsequently, channel coding is performed (S12030). Output bits after the channel coding are shown in $d_{r0}^{(i)}, d_{r1}^{(i)}, d_{r2}^{(i)}, d_{r3}^{(i)}, \ldots, d_{r(D_r-1)}^{(i)}$. In this case, i represents an encoded stream index and may have a value of 0, 1, or 2. Dr represents the number of bits of the i-th encoded stream for the code block r. r represents the code block number ($r=0, \ldots, C-1$) and C represents the total number of code blocks. Each code block may be encoded by turbo coding.

Subsequently, rate matching is performed (S12040). Bits after the rate matching are shown in $e_{r0}, e_{r1}, e_{r2}, e_{r3}, \ldots, e_{r(E_r-1)}$. In this case, r represents the code block number ($r=0, \ldots, C-1$) and C represents the total number of code blocks. Er represents the number of rate-matched bits of the r-th code block.

Subsequently, concatenation among the code blocks is performed again (S12050). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S12070, S12080, and S12090). Since different encoded symbols are allocated for transmitting each control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S134, encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ of the CQI/PMI are multiplexed (S12060). A multiplexed result of the data and the CQI/PMI is shown in $g_0, g_1, g_2, g_3, \ldots, g_{H'-1}$. In this case, $g_i$ ($i=0, \ldots, H'-1$) represents a column vector having a length of ($Q_m \cdot N_L$). $H=(G+N_L \cdot Q_{CQI})$ and $H'=H/(N_L \cdot Q_m)$.

$N_L$ represents the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S12100).

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method capable of greatly improving a communication capacity and transmission and reception performance without additional frequency allocation or power increment has the largest attention in recent years.

Figure 13:
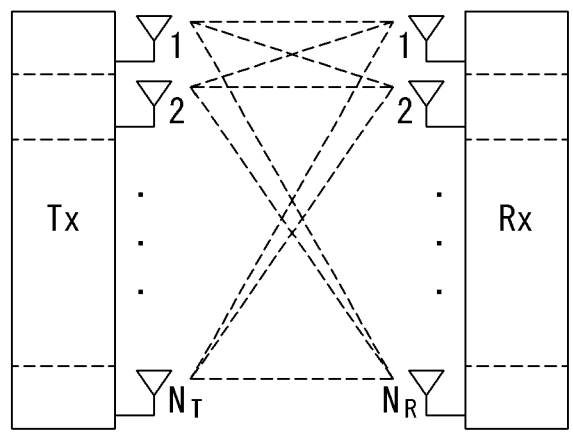
FIG. 13 is a diagram of a general multiple input multiple output (MIMO) antenna communication system.

FIG. 13 is a configuration diagram of a general multiple input multiple output (MIMO) communication system.

Referring to FIG. 13, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency can be greatly improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \quad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 13.

First, in respect to a transmission signal, when NT transmitting antennas are provided, since the maximum number of transmittable information is NT, NT may be expressed as a vector given below.

$$s = [s_1, s_2, \ldots, s_{N_T}]^T \quad \text{[Equation 2]}$$

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, ..., xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$ [Equation 5]

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, ..., yNR of the respective antennas are expressed as a vector y as described below.

$$y = [y_1, y_2, \ldots, y_{N_R}]^T$$ [Equation 6]

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

Figure 14:
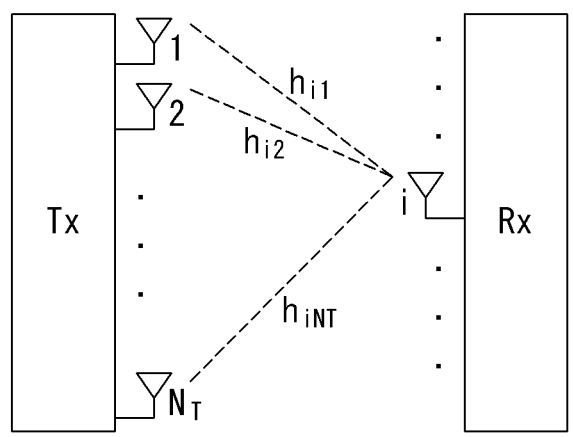
FIG. 14 is a diagram illustrating a channel from multiple transmission antennas to a single reception antenna.

FIG. 14 is a diagram illustrating a channel from multiple transmitting antennas to one receiving antenna.

As illustrated in FIG. 14, a channel which reaches receiving antenna I from a total of NT transmitting antennas may be expressed as below.

$$h_i^T = [h_{i1}, h_{i2}, \ldots, h_{iN_T}]$$ [Equation 7]

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

Meanwhile, since additive white Gaussian noise (AWGN) is added after passing through a channel matrix H given above in an actual channel, white noises n1, n2, ..., nNR added to NR receiving antennas, respectively are expressed as below.

$$n = [n_1, n_2, \ldots, n_{N_R}]^T$$ [Equation 9]

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R)$$ [Equation 11]

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Reference Signal (RS)

In a wireless communication system, a signal may be distorted during transmission because data is transmitted through a radio channel. In order for a user equipment to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The above-described signal is called a pilot signal or reference signal (RS).

Furthermore, recently when a packet is transmitted in most of mobile communication systems, a method capable of enhancing transmission and reception data efficiency by adopting a multi-transmission antenna and a multi-reception antenna instead of using one transmission antenna and one reception antenna is used. When data is transmitted and received using multiple input and output antennas, a channel state between the transmission antenna and the reception antenna must be detected in order to receive a signal precisely. Accordingly, each transmission antenna must have an individual reference signal.

In a mobile communication system, an RS may be basically divided into two types depending on its purpose. There are an RS used for channel information acquisition and an RS used for data demodulation. The former must be transmitted in a broadband because it is used for a UE to obtain channel information toward the downlink, and it must be received and measured by even a UE that does not receive downlink data in a specific subframe. Furthermore, the former is also used for measurement, such as handover. The latter is an RS also transmitted in a corresponding resource when a base station transmits downlink, and a UE can perform channel estimation by receiving a corresponding RS and thus can demodulate data. This RS needs to be transmitted in a region in which data is transmitted.

A downlink reference signal includes one common reference signal (CRS) for the information acquisition of a channel state shared by all user equipments within a cell and for the measurement of handover and a dedicated reference signal (DRS) used for data demodulation for only a specific user equipment. Information for demodulation and channel measurement may be provided using such reference signals. That is, a DRS is used for only data demodulation, and a CRS is used for two purposes of channel information acquisition and data demodulation.

A reception side (i.e., UE) measures a channel state based on a CRS and feeds an indicator related to channel quality, such as a channel quality indicator (CQI), a precoding matrix index (PMI) and/or a rank indicator (RI), back to a transmission side (i.e., an eNB). A CRS is also called a cell-specific RS. In contrast, a reference signal related to the feedback of channel state information (CSI) may be defined as a CSI-RS.

A DRS may be transmitted through resource elements if data on a PDSCH needs to be demodulated. A user equipment may receive information regarding whether a DRS is present through a higher layer, and a DRS is valid only when a corresponding PDSCH has been mapped. A DRS may also be called a UE-specific RS or demodulation RS (DMRS).

Figure 15:
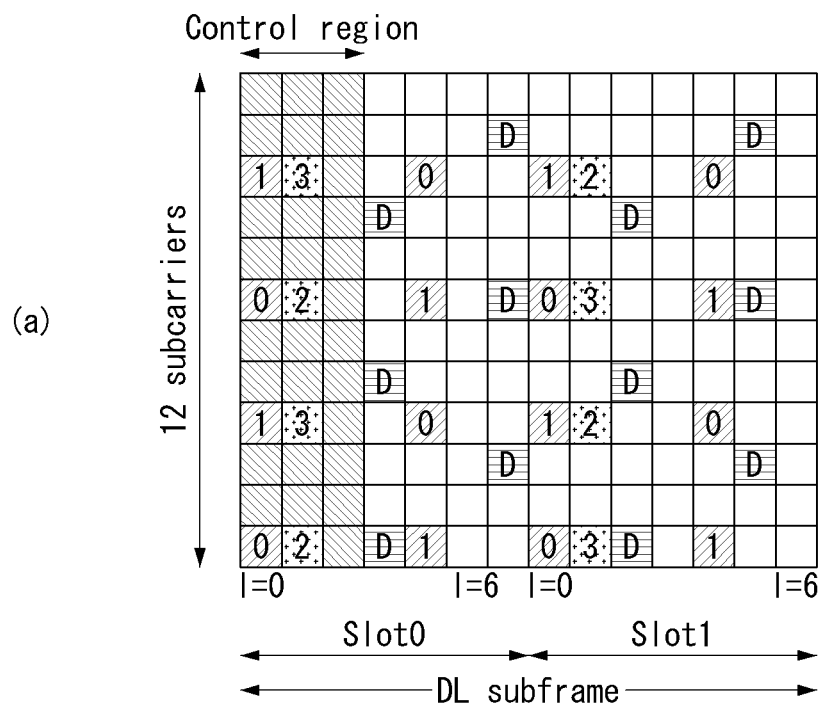
FIG. 15 is a diagram showing an example of a reference signal pattern mapped to a downlink resource block pair in a wireless communication system to which the present invention may be applied.
Figure 15:
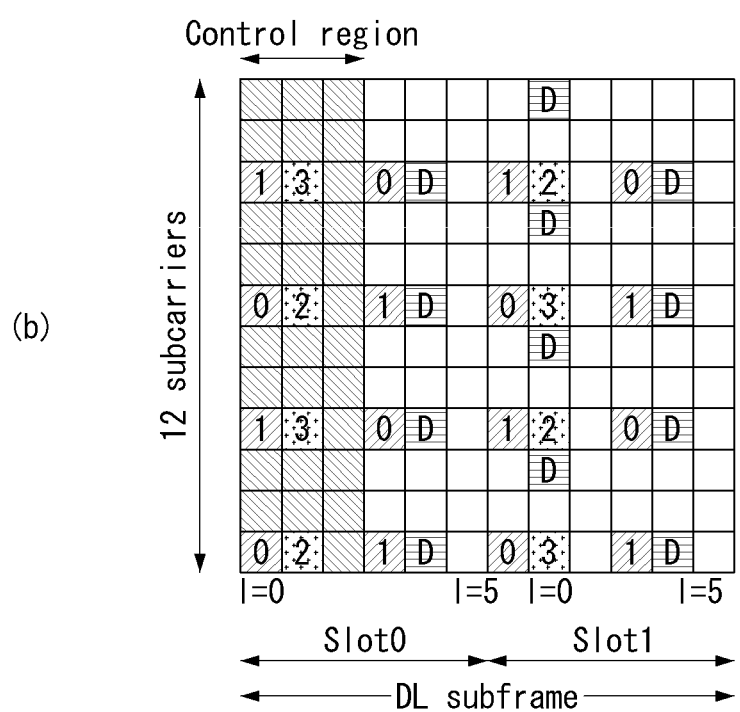

FIG. 15 is a diagram showing an example of a reference signal pattern mapped to a downlink resource block pair in a wireless communication system to which the present invention may be applied.

Referring to FIG. 15, a downlink resource block pair, that is, a unit in which a reference signal is mapped, may be represented as one subframe in the time domain×12 subcarriers in the frequency domain. That is, in a time axis (x axis), one resource block pair has a length of 14 OFDM symbols (in the case of FIG. 5($a$)) in a normal cyclic prefix (CP) and has a length of 12 OFDM symbols (in the case of FIG. 5($b$)) in an extended cyclic prefix (extended CP). In the resource block lattice, resource elements (REs) indicated as "0", "1", "2" and "3" mean the positions of the CRSs of respective antenna port indices "0", "1", "2" and "3". Resource elements indicated as "D" mean the positions of DRSs.

Hereinafter, a CRS is described more specifically. A CRS is a reference signal which is used to estimate the channel of a physical antenna and may be received by all user equipments positioned within a cell in common. A CRS is distributed in a full frequency band. That is, the CRS is a cell-specific signal and is transmitted every subframe with respect to a broadband. Furthermore, a CRS may be used for channel quality information (CSI) and data demodulation.

A CRS is defined in various formats based on an antenna array on the transmission side (base station). In a 3GPP LTE system (e.g., Release-8), an RS for a maximum of 4 antenna ports is transmitted depending on the number of transmission antennas of a base station. The downlink signal transmission side has three types of antenna arrays, such as a single transmission antenna, two transmission antennas and four transmission antennas. For example, if the number of transmission antennas of a base station is two, a CRS for Nos. 0 and 1 antenna ports is transmitted. If the number of transmission antennas of a base station is four, CRSs for Nos. 0~3 antenna ports are respectively transmitted.

If a base station uses a single transmission antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \qquad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \ne 0 \\ 3 & \text{if } p = 1 \text{ and } l = 0 \\ 0 & \text{if } p = 1 \text{ and } l \ne 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 13 shows the case of the extended CP.

$$k = (k') \bmod N_{sc}^{RB} + N_{sc}^{RB} \cdot n_{PRB} \qquad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ is subordinated to the cell ID, the position of the reference signal has various frequency shift values according to the cell.

In an LTE-A system of an evolved form of the LTE system, the design needs to be performed to support a maximum of 8 transmission antennas in the downlink of a base station. Accordingly, an RS for the maximum of 8 transmission antennas must be also supported. In the LTE system, only a downlink RS for a maximum of 4 antenna ports has been defined. If a base station has 4 or a maximum of 8 downlink transmission antennas in the LTE-A system, an RS for such antenna ports needs to be additionally defined and designed. Regarding the RS for a maximum of 8 transmission antenna ports, both the above-described RS for channel measurement and the above-described RS for data demodulation must be designed.

One of important considerations in designing an LTE-A system is backward compatibility. That is, an LTE user equipment must well operate in the LTE-A system without any difficulty, and the system must support this. From a viewpoint of RS transmission, an RS for a maximum of 8 transmission antenna ports must be additionally defined in the time-frequency domain in which a CRS defined in LTE is transmitted every subframe in a full band. In the LTE-A system, if an RS pattern for the maximum of 8 transmission antenna is added to a full band every subframe using a method, such as that for the CRS of the existing LTE, RS overhead excessively increases.

Accordingly, an RS newly designed in the LTE-A system may be basically divided into two types, that is, an RS for channel measurement for the selection of an MCS, PMI, etc. (channel state information-RS, channel state indication-RS (CSI-RS)) and a data demodulation-RS for data demodulation transmitted in 8 transmission antennas.

The existing CRS is used for channel measurement, the measurement of handover, etc. and for data demodulation, whereas the CSI-RS for channel measurement is designed for a channel measurement-oriented purpose. Furthermore, the CSI-RS for channel measurement may also be used for the measurement of handover. Since the CSI-RS is used to obtain information on the channel state only, it does not need to be transmitted every subframe unlike the CRS. In order to reduce overhead of the CSI-RS, the CSI-RS is intermittently transmitted on the time axis.

A DMRS is dedicatedly transmitted to a UE scheduled in a corresponding time-frequency domain for data demodulation. That is, the DM-RS of a specific UE is transmitted only in a region in which a corresponding UE is scheduled, that is, only in a time-frequency domain in which data is received.

In the LTE-A system, an eNB has to transmit a CSI-RS for all antenna ports. To transmit a CSI-RS for a maximum of 8 transmission antenna ports every subframe has a disadvantage in that overhead is too great. Accordingly, the CSI-RS is not transmitted every subframe, but needs to be intermittently transmitted in the time axis in order to reduce corresponding overhead. That is, the CSI-RS may be periodically transmitted in the period of a multiple of one subframe or may be transmitted in a specific transmission pattern. In this case, the period or pattern in which the CSI-RS is transmitted may be configured by the eNB.

In order to measure a CSI-RS, a UE must be aware of the transmission subframe index of a CSI-RS for each CSI-RS antenna port of a cell to which the UE belongs, a CSI-RS resource element (RE) time-frequency position within the transmission subframe, and information on a CSI-RS sequence.

In the LTE-A system, an eNB needs to transmit a CSI-RS with respect to each of a maximum of 8 antenna ports. Resources used for the CSI-RS transmission of different antenna ports need to be orthogonal. When one eNB transmits CSI-RSs for different antenna ports, it may orthogonally allocate resources according to the FDM/TDM scheme by mapping the CSI-RSs for the respective antenna ports to different REs. Alternatively, the eNB may transmit the CSI-RSs for different antenna ports according to a CDM scheme for mapping the CSI-RSs to orthogonal codes.

When an eNB notifies its own cell UE of information on a CSI-RS, first, it has to notify the UE of information on a time-frequency to which a CSI-RS for each antenna port is mapped. Specifically, the information includes subframe numbers in which a CSI-RS is transmitted or the period in which a CSI-RS is transmitted, a subframe offset in which a CSI-RS is transmitted, an OFDM symbol number in which a CSI-RS RE of a specific antenna is transmitted, frequency spacing, an offset or shift value of an RE in the frequency axis, and so on.

Communication System Using Ultra-High Frequency Band

In a long term evolution (LTE)/LTE advanced (LTE-A) system, an error value of the oscillator of a user equipment and a base station is regulated as a requirement and is described as follows.

UE Side Frequency Error (in TS 36.101)

The UE modulated carrier frequency shall be accurate to within ±0.1 PPM observed over a period of one time slot (0.5 ms) compared to the carrier frequency received from the E-UTRA Node B eNB Side Frequency Error (in TS 36.104)

Frequency error is the measure of the difference between the actual BS transmit frequency and the assigned frequency.

Meanwhile, an oscillator accuracy depending on the type of a base station is described in Table 9.

TABLE 9

| BS class | Accuracy |
| --- | --- |
| Wide Area BS | ±0.05 ppm |
| Local Area BS | ±0.1 ppm |
| Home BS | ±0.25 ppm |

Accordingly, when a maximum difference of the oscillator between a base station and a user equipment is ±0.1 ppm and an error occurs in one direction, an offset value of a maximum of 0.2 ppm may occur. Such an offset value is converted into a Hz unit suitable for each center frequency by multiplying the offset value by the center frequency.

Meanwhile, in the OFDM system, a CFO value differently appears based on a frequency tone interval. In general, although the CFO value is large, the influence on an OFDM system having a sufficiently large frequency tone interval is relatively small. Accordingly, an actual CFO value (absolute value) needs to be represented as a relative value that influences the OFDM system, which is called a normalized CFO. The normalized CFO is represented as a value obtained by dividing a CFO value by a frequency tone interval. Table 10 shows CFOs and normalized CFOs for an error value of each center frequency and oscillator.

TABLE 10

| Center frequency | Oscillator Offset | | | |
| --- | --- | --- | --- | --- |
| (subcarrier spacing) | ±0.05 ppm | ±0.1 ppm | ±10 ppm | ±20 ppm |
| 2 GHz | ±100 Hz | ±200 Hz | ±20 kHz | ±40 kHz |
| (15 kHz) | (±0.0067) | (±0.0133) | (±1.3) | (±2.7) |
| 30 GHz | ±1.5 kHz | ±3 kHz | ±300 kHz | ±600 kHz |
| (104.25 kHz) | (±0.014) | (±0.029) | (±2.9) | (±5.8) |
| 60 GHz | ±3 kHz | ±6 kHz | ±600 kHz | ±1.2 MHz |
| (104.25 kHz) | (±0.029) | (±0.058) | (±5.8) | (±11.5) |

In Table 10, a frequency tone interval (15 kHz) is assumed when the center frequency is 2 GHz (e.g., LTE Rel-8/9/10). When the center frequency is 30 GHz, 60 GHz, performance degradation in which a Doppler influence is consideration with respect to each center frequency is prevented using a frequency tone interval of 104.25 kHz. Table 2 is a simple example, and it is evident that a different frequency tone interval may be used for the center frequency.

Meanwhile, in the situation in which a user equipment moves at high speed or the situation in which a user equipment moves in a high frequency band, a great Doppler spread phenomenon occurs. Doppler spread causes spread in the frequency domain. As a result, this generates the distortion of a received signal from the viewpoint of a receiver. Doppler spread may be represented as $f_{doppler}=(v/\lambda)\cos\theta$. In this case, v is the moving speed of a user equipment, and λ means the wavelength of the center frequency of a transmitted radio wave. Θ means an angle between a received radio wave and the moving direction of the user equipment. A case where θ is 0 is described as a precondition.

In this case, a coherence time has an inverse proportion to the Doppler spread. If the coherence time is defined as a time interval in which the correlation value of a channel response in the time domain is 50% or more, it is represented as $$T_c \approx \frac{9}{16\pi f_{doppler}}.$$

In a wireless communication system, Equation 15 is chiefly used which indicates the geometric mean between an equation for the Doppler spread and an equation for the coherence time.

$$T_c = \sqrt{\frac{9}{16\pi f_{doppler}}} = \frac{0.423}{f_{doppler}} \quad \text{[Equation 15]}$$

New Radio Access Technology System

As more communication devices require a greater communication capacity, there is a need for enhanced mobile broadband communication compared to the existing radio access technology (RAT). Furthermore, massive machine type communications (MTC) providing various services anywhere and at any time by connecting multiple devices and things is also considered. Furthermore, a communication system design in which a service/UE sensitive to reliability and latency are considered is discussed.

The introduction of a new radio access technology in which enhanced mobile broadband communication, massive MTC, and ultra-reliable and low latency communication (URLLC) as described above are considered is discussed. In the present invention, the corresponding technology is named a new RAT (hereinafter NR) for convenience sake.

Phase Tracking Reference Signal (PTRS)

Hereinafter, a PTRS is described in detail.

A PTRS may be called a phase (noise) compensation reference signal (PCRS) or a phase noise reference signal (PDNS).

DL PTRS Procedure

When a UE detects an xPDCCH having the DCI format B1 or B2 in its intended subframe n, the UE receives a DL PTRS in a PTRS antenna port indicated in DCI in the corresponding subframe.

UL PTRS Procedure

When a UE detects an xPDCCH having the DCI format A1 or A2 in its intended subframe n, the UE transmits an UL PTRS in a subframe n+4+m+1 using one or two PTRS antenna ports identical with an allocated DM-RS antenna port indicated in DCI other than the following conditions (condition 1 and condition 2).

Condition 1: if the dual PTRS field of detected DCI is set to "1" and the number of DM-RS ports allocated to an xPUSCH is "1", a UE transmits an UL PTRS in a subframe n+4+m+1 using the same PTRS port as an additional PTRS antenna port having the same subcarrier position as an allocated DM-RS antenna port and specific PTRS antenna port indicated in DCI.

Condition 2: a relative transmission power ratio between a PTRS and an xPUSCH is determined by a transmission method defined by Table 3.

Table 11 shows an example of the relative transmit power ratio of a PTRS and an xPUSCH on a given layer.

TABLE 11

| Transmission Scheme | Relative Transmit Power Ratio |
| --- | --- |
| Single-layer transmission | 3 dB |
| Two-layer transmission | 6 dB |

Hereinafter, a PTRS is described more specifically.

A PTRS associated with an xPUSCH is (1) transmitted in an antenna port(p) p□{40,41,42,43}, (2) a valid criterion for phase noise compensation only when the PTRS is present and xPUSCH transmission is related to a corresponding antenna port, and (3) transmitted on physical resource blocks and symbols to which a corresponding xPUSCH is mapped.

Sequence Generation

A reference signal sequence r(m) is defined like Equation 16 with respect to a given antenna port, that is, p□{40,41, 42,43}.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 16]}$$

$$m = 0, 1, \ldots, \lfloor N_{RB}^{max,UL}/4 \rfloor - 1$$

A pseudo-random sequence c(i) is defined by a Gold sequence of length-31, and a pseudo-random sequence generator is initialized at the start of each subframe as in Equation 17.

$$c_{init} = (\lfloor n_s/2 \rfloor + 1) \cdot (2n_{ID}^{(nSCID)} + 1) \cdot 2^{16} + n_{SCID} \quad \text{[Equation 17]}$$

$n_{ID}^{(i)}$ quantity(i=0,1) is given as below.

$n_{ID}^{(i)} = N_{ID}^{(cell)}$, if any value is not given by a higher layer with respect to $n_{ID}^{(PTRS,i)}$.

$n_{ID}^{(i)} = n_{ID}^{(PTRS,i)}$, if a value is given by a higher layer with respect to $n_{ID}^{(PTRS,i)}$.

The value of $n_{SCID}$ is 0 unless specified otherwise. For xPUSCH transmission, $n_{SCID}$ is given by a DCI format associated with xPUSCH transmission.

Mapping to Resource Elements

In a physical resource block having a frequency domain index n_PRB allocated for corresponding xPUSCH transmission with respect to an antenna port p□{40,41,42,43}, part of a reference signal sequence r(m) is mapped to a complex-value modulation symbol $a_{k,l}^{(p)}$ for corresponding xPUSCH symbols in a subframe according to $a_{k,l}^{(p)} = r(k'')$.

A resource element (k,l') for one subframe is given like Equation 18 with respect to the start physical resource block index $n_{PRB}^{xPUSCH}$ of xPUSCH physical resource allocation and the number of xPUSCH physical resource blocks $N_{PRB}^{xPUSCH}$.

$$k = N_{sc}^{RB} \cdot (n_{PRB}^{xPUSCH} + k'' \cdot 4) + k' \quad \text{[Equation 18]}$$

$$k' = \begin{cases} 16 & p \in \{40, 41\} \\ 31 & p \in \{42, 43\} \end{cases}$$

$$k'' = \lfloor m'/4 \rfloor$$

-continued $$l' = \begin{cases} \{l' \mid l' \in \{3, \ldots, l_{last}^{rxPUSCH}\} \\ \text{and } l' \text{ is an odd number}\}, & p \in \{40 + m'', 42 + m''\} \\ \{l' \mid l' \in \{3, \ldots, l_{last}^{rxPUSCH}\} \\ \text{and } l' \text{ is an even number}\}, & p \in \{41 - m'', 43 - m''\} \end{cases}$$

$$m' = 0, 1, 2, \ldots, N_{PRB}^{xPUSCH} - 1$$

$$m'' = \lfloor m'/4 \rfloor \bmod 2$$

In Equation 18, m=0, 1, 2, . . . , $N_{PRB}^{xPUSCH}$, l indicates a symbol index within one subframe, and $l'_{last}^{xPUSCH}$ indicates the last symbol index of an xPUSCH for a given subframe.

A resource element (k,l) used for the transmission of a UE-specific PTRS from one UE on a given antenna port in a set S is not used for the transmission of an xPUSCH on a given antenna port in the same subframe.

In this case, S is {40}, {41}, {42}.

Carrier Frequency Offset (CFO) Effect

A baseband signal transmitted by a transmission stage (e.g., base station) shifts to a pass band due to a carrier frequency occurred in the oscillator. The signal transmitted through the carrier frequency is converted into a baseband signal by the same carrier frequency in a reception stage (e.g., user equipment).

In this case, the signal received by the reception stage may include distortion related to a carrier.

As an example of such distortion, there may be a distortion phenomenon occurring due to a difference between the carrier frequency of a transmission stage and the carrier frequency of a reception stage.

The reason why such a carrier frequency offset occurs is that oscillators used in the transmission stage and the reception stage are not the same or a Doppler frequency shift occurs due to a movement of a user equipment.

In this case, the Doppler frequency is proportional to the moving speed of the user equipment and the carrier frequency and is defined like Equation 19.

$$f_d = \frac{v \cdot f_c}{c} \quad \text{[Equation 19]}$$

In Equation 19, $f_c$, $f_d$, v, c sequentially indicate a carrier frequency, a Doppler frequency, the moving speed of a user equipment, and the speed of light.

Furthermore, a normalized carrier frequency offset(ε) is defined like Equation 20.

$$\varepsilon = \frac{f_{offset}}{\Delta f} \quad \text{[Equation 20]}$$

In Equation 20, $f_{offset}$, $\Delta f$, ε sequentially indicate a carrier frequency offset, a subcarrier spacing, and a normalized carrier frequency offset at a subcarrier spacing.

If a carrier frequency offset is present, a received signal in the time domain is the results of the production of a transmitted signal and phase rotation. A received signal in the frequency domain is the results of a shift of a transmitted signal in the frequency domain.

In this case, inter-carrier-interference (ICI) occurs due to the influence of all other subcarrier(s).

That is, when a decimal multiple carrier frequency offset occurs, a received signal in the frequency domain is represented like Equation 21.

Equation 21 shows a received signal having a CFO in the frequency domain.

$$Y_l[k] = e^{j\pi\varepsilon(N-1)/N}\left\{\frac{\sin\pi\varepsilon}{N\sin(\pi\varepsilon/N)}\right\}H_l[k]X_l[k] + I_l[k] + Z[k] \quad \text{[Equation 21]}$$

In Equation 21, k,l,N,Y[•],X[•],H[•],I[•],Z[•] sequentially indicate a subcarrier index, a symbol index, an FFT size, a received signal, a transmitted signal, a frequency response, and ICI attributable to a CFO, and white noise.

As defined in Equation 21, it may be seen that if a carrier frequency offset is present, the amplitude and phase of a k-th subcarrier are distorted and interference attributable to a neighbor subcarrier occurs.

In this case, if a carrier frequency offset is present, interference attributable to a neighbor subcarrier may be given like Equation 22.

Equation 22 shows ICI caused by a CFO.

$$I_l[k] = e^{j\pi\varepsilon(N-1)/N} \quad \text{[Equation 22]}$$

$$\sum_{\substack{m=0 \\ m \neq k}}^{N-1} H[m]X_l[m]\left\{\frac{\sin\pi\varepsilon}{N\sin(\pi(m-k+\varepsilon)/N)}\right\}e^{-j\pi(m-k)/N}$$

Phase Noise Effect

As described above, a baseband signal transmitted by a transmission stage shifts to a pass band by a carrier frequency generated from an oscillator. The signal transmitted through the carrier frequency is converted into a baseband signal by the same carrier frequency in a reception stage.

In this case, the signal received by the reception stage may include distortion related to a carrier.

An example of such a distorted phenomenon may include phase noise occurring because the characteristics of oscillators used in a transmission stage and a reception stage are not stable.

Such phase noise means that the frequency varies over time around a carrier frequency.

Such phase noise is modeled as a Wiener process, that is, a random process having an average of 0, and affects an OFDM system.

Such phase noise has a tendency in which the characteristic of an oscillator is determined based on the same power spectral density.

Figure 16:
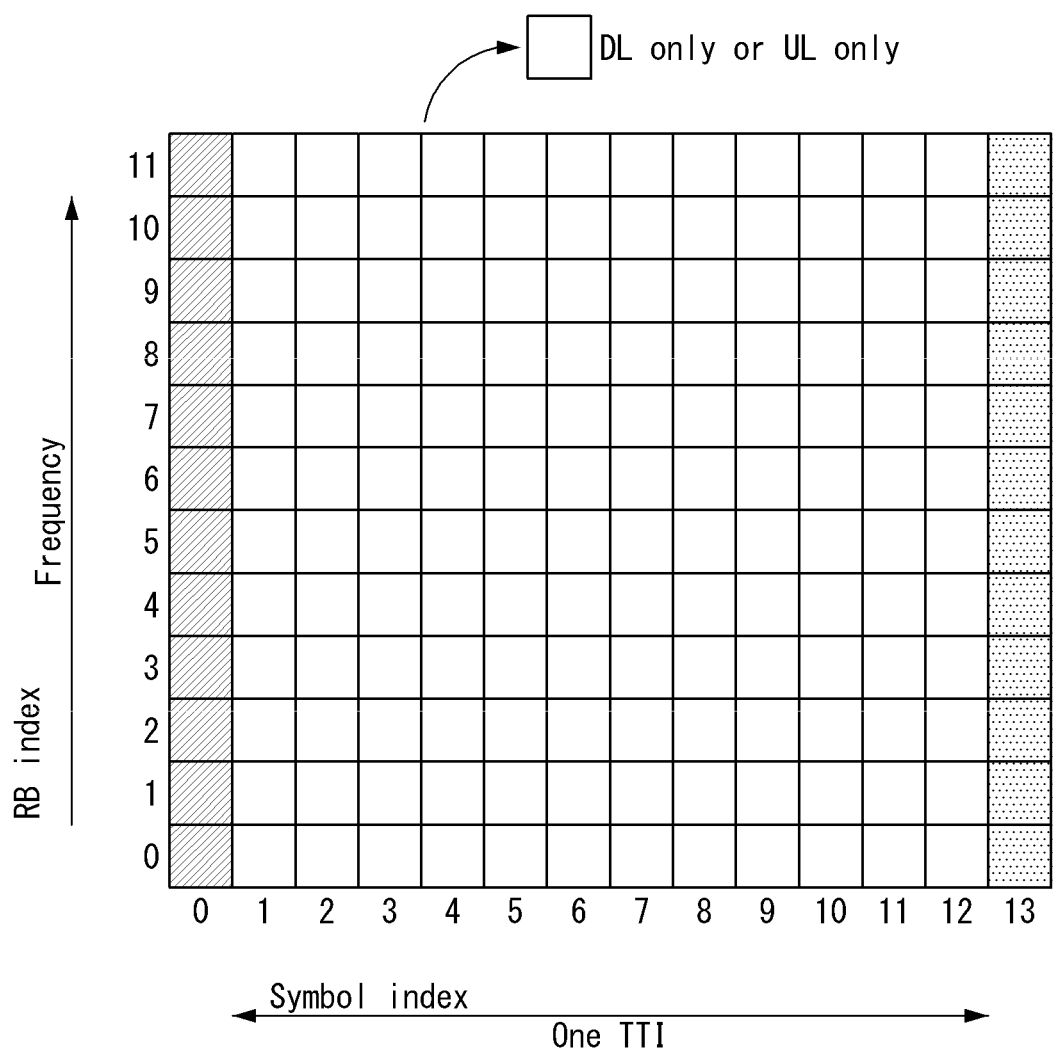
FIG. 16 is a diagram showing an example of a subframe structure to which the present invention may be applied.

FIG. 16 is a diagram showing an example of a subframe structure to which the present invention may be applied.

In FIG. 16, a slashed region (e.g., symbol index=0) indicates a downlink control region, and a black region (e.g., symbol index=13) indicates an uplink control region. Other regions (e.g., symbol index=1~12) may be used for downlink data transmission and may be used for uplink data transmission.

In such a characteristic of the structure, DL transmission and UL transmission may be sequentially performed within one subframe, and DL data may be transmitted and received within the one subframe and corresponding UL ACK/NACK may also be transmitted and received. As a result, such a structure reduces the time taken for data retransmission when a data transmission error occurs, and thus latency of the final data transfer can be minimized.

In such a self-contained subframe structure, in order for a base station and a UE to switch from a transmission mode to a reception mode or from the reception mode to the transmission mode, a time gap of a given time length is necessary. To this end, in the self-contained subframe structure, some OFDM symbols at a point of time switching from the DL to the UL may be configured as a guard period (GP).

In the above-described detailed description, a self-contained subframe structure has been illustrated as including both a DL control region and an UL control region, but control regions may be selectively included in the self-contained subframe structure. In other words, a self-contained subframe structure according to the present invention may include a case where only a DL control region or an UL control region is included in addition to a case where both a DL control region and an UL control region are included as in FIG. 6.

OFDM Numerology

A new RAT system uses an OFDM transmission method or a transmission method similar to the OFDM transmission method. In this case, the new RAT system may have an OFDM numerology, such as Table 12, representatively.

TABLE 12

| Parameter | Value |
| --- | --- |
| Subcarrier-spacing (Δf) | 75 kHz |
| OFDM symbol length | 13.33 us |
| Cyclic Prefix (CP) length | 1.04 us/0/94 us |
| System BW | 100 MHz |
| No. of available subcarriers | 1200 |
| Subframe length | 0.2 ms |
| Number of OFDM symbol per subframe | 14 symbols |

Alternatively, the New RAT system uses an OFDM transmission method or a transmission method similar to the OFDM transmission method, and may use an OFDM numerology selected from multiple OFDM numerologies, such as Table 13. Specifically, as disclosed in Table 13, the new RAT system may use OFDM numerologies having 30, 60, and 120 kHz subcarrier spacings having a multiple relation with a 15 kHz subcarrier spacing based on the 15 kHz subcarrier spacing used in the LTE system.

In this case, the cyclic prefix, system bandwidth (BW), and the number of available subcarriers disclosed in Table 13 are only examples applicable to a new RAT system according to the present invention, and the values may be changed depending on an implementation method. Representatively, in the case of the 60 kHz subcarrier spacing, a system bandwidth may be configured as 100 MHz. In this case, the number of available subcarriers may have a value more than 1500 and smaller than 1666.

Furthermore, the subframe length and the number of OFDM symbols per subframe disclosed in Table 13 are only examples applicable to a new RAT system according to the present invention, and the values may be changed depending on an implementation method.

TABLE 13

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 us | 33.33 us | 16.66 us | 8.33 us |
| Cyclic Prefix(CP) length | 5.20 us/4.69 | 2.60 us/2.34 us | 1.30 us/1.17 us | 6.51 us/5.86 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per subframe | 14 symbols | 14 symbols | 14 symbols | 14 symbols |

Figure 17:
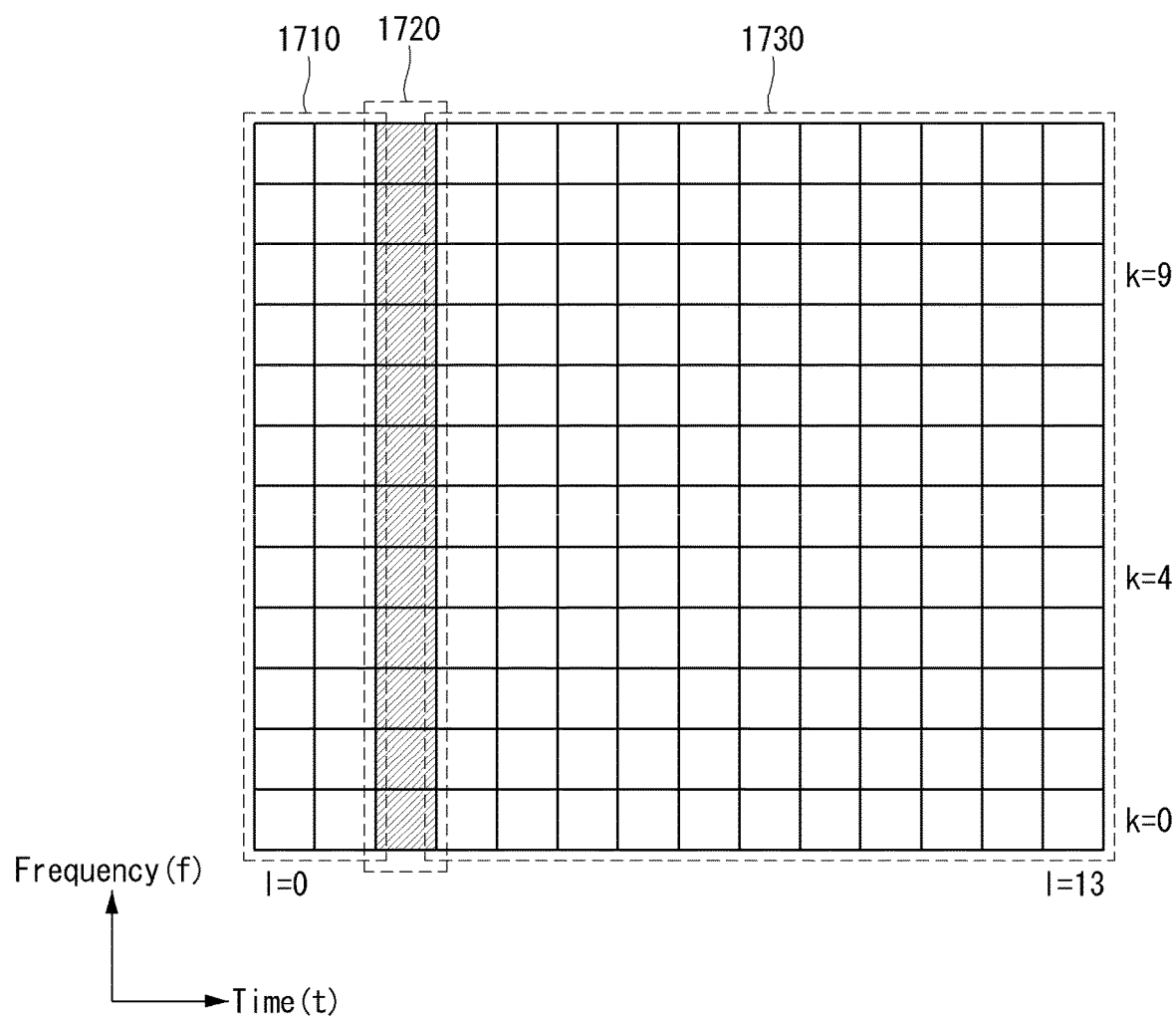
FIG. 17 is a diagram showing an example of a resource region structure used in a communication system using mmWave to which the present invention may be applied.

FIG. 17 is a diagram showing an example of a resource region structure used in a communication system using mmWave to which the present invention may be applied.

A communication system using an ultra-high frequency band, such as mmWave, uses a frequency band having a physical property different from that of a conventional LTE/LTE-A communication system. Accordingly, in a communication system using an ultra-high frequency band, a resource structure of a form different from that of the structure of a resource region used in a conventional communication system is discussed. FIG. 16 shows an example of a downlink resource structure of a new communication system.

When a resource block (RB) pair configured with 14 orthogonal frequency division multiplexing (OFDM) symbols in a horizontal axis and 12 frequency tones in a vertical axis is considered, the first two (or three) OFDM symbols 1610 are allocated to a control channel (e.g., a physical downlink control channel (PDCCH)) as in a conventional technology, a demodulation reference signal (DMRS) is allocated to next one or two OFDM symbols 1620, and a data channel (e.g., a physical downlink shared channel (PDSCH)) may be allocated to the remaining OFDM symbols 1630.

Meanwhile, in a resource region structure, such as FIG. 17, the above-described PCRS or PNRS or PTRS for CPE (or CFO) estimation may be carried on some resource elements (REs) of the region 1730 to which the data channel is allocated and transmitted to a user equipment. Such a signal is a signal for estimating phase noise and may be a pilot signal as described above and may be a signal changed or duplicated from a data signal.

The present invention proposes a method of transmitting a DMRS for channel estimation in downlink or uplink.

Figure 18:
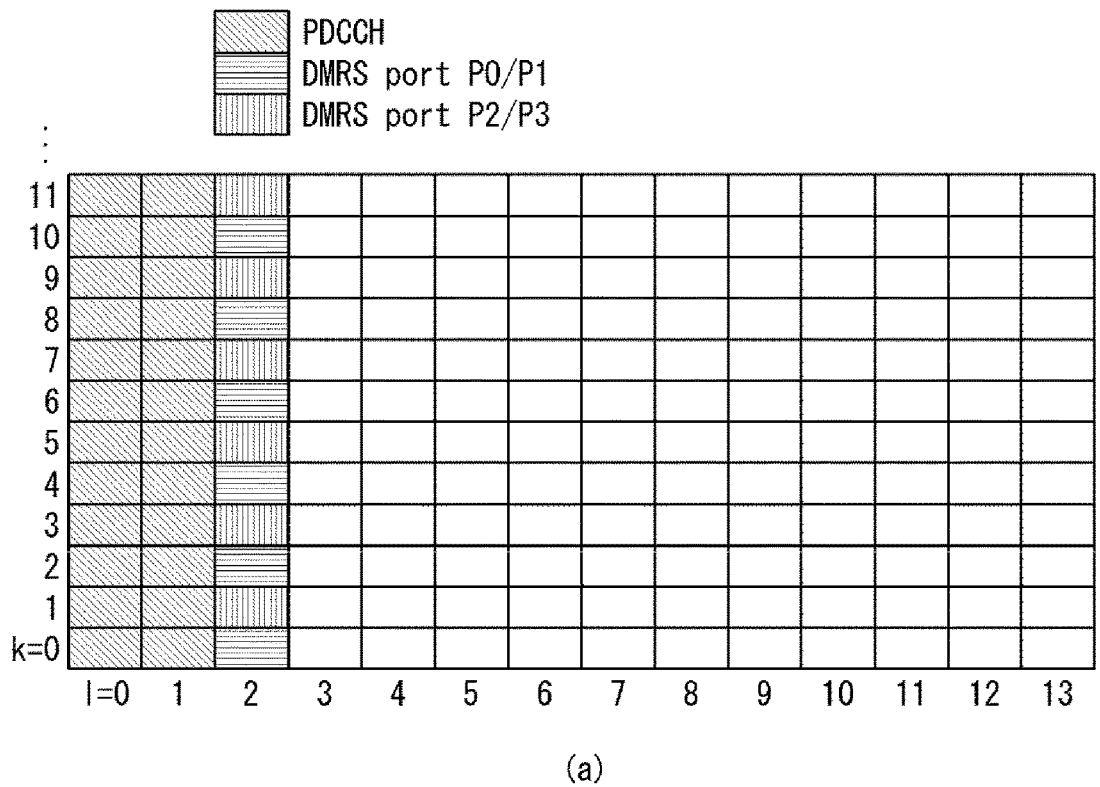
FIGS. 18 and 19 are examples of a pattern of a demodulation reference signal proposed in this specification.
Figure 18:
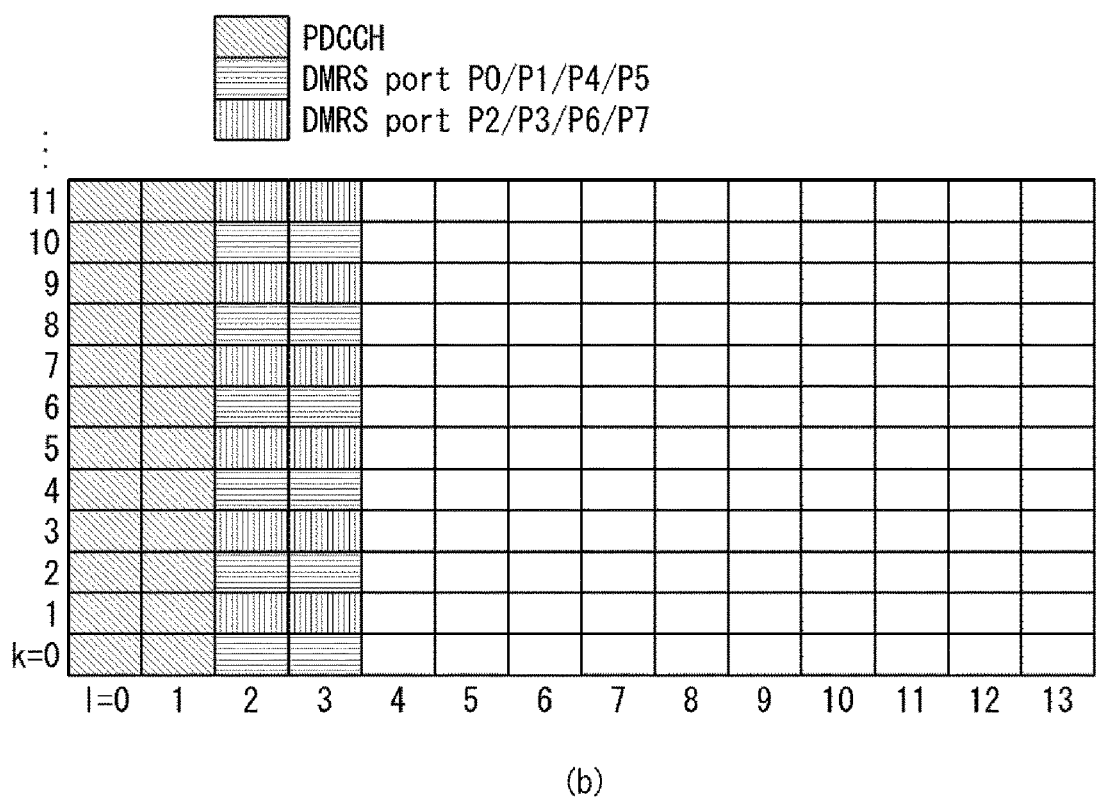
Figure 19:
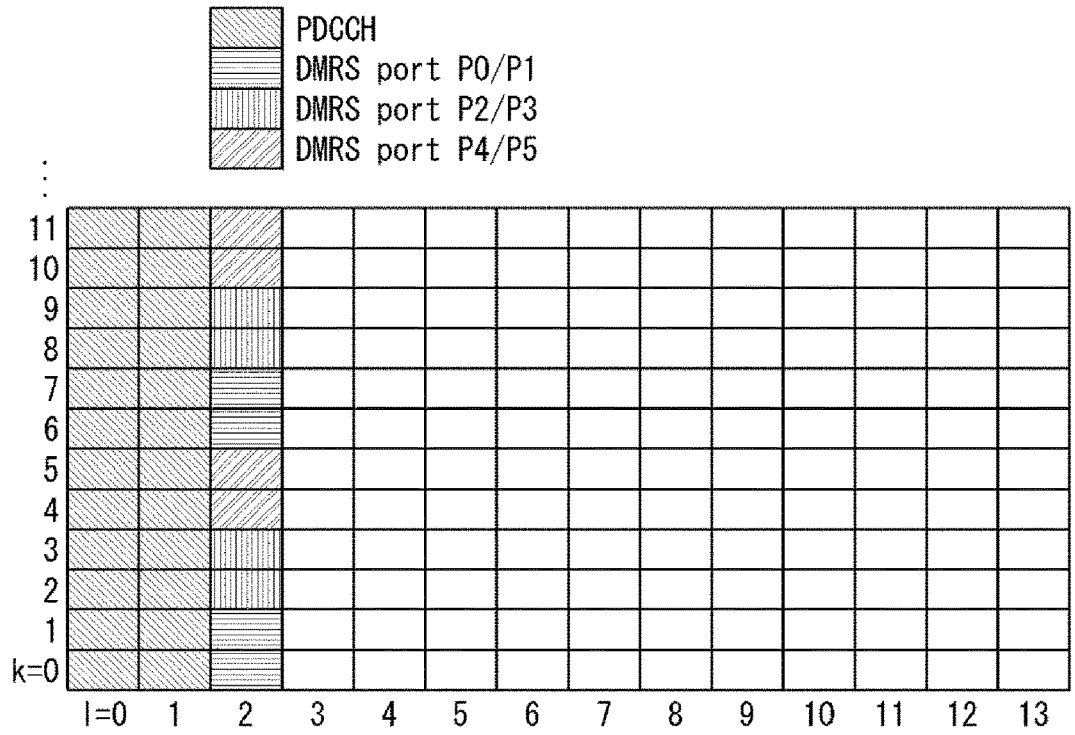
Figure 19:
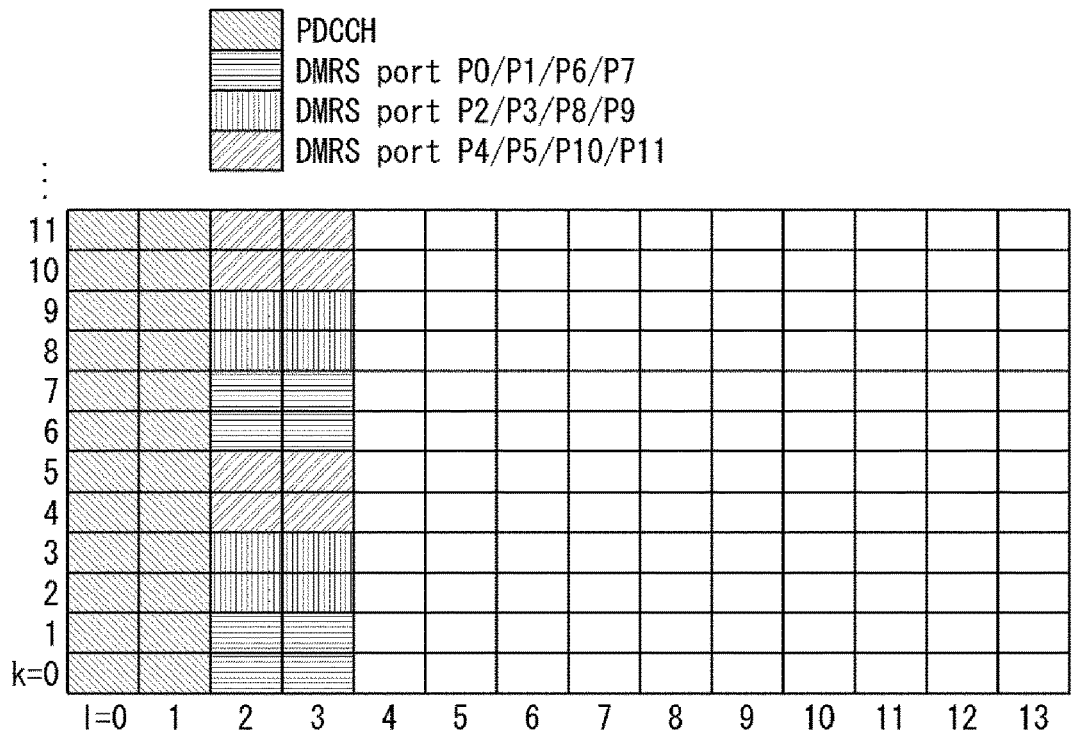

FIGS. 18 and 19 are examples of a pattern of a demodulation reference signal proposed in this specification.

Referring to FIGS. 18 and 19, a demodulation reference signal for estimating a channel may be mapped to one symbol or two symbols depending on the number of antenna ports.

Specifically, an uplink DMRS and downlink DMRS may be generated according to the following method and may be mapped to a resource region. FIG. 18 shows an example of an uplink or downlink DMRS mapped to a physical resource according to Type 1, and FIG. 19 shows an example of an uplink or downlink DMRS mapped to a physical resource according to Type 2.

A demodulation reference signal for estimating uplink data or downlink data is generated by mapping a demodulation reference sequence to an OFDM symbol.

A demodulation reference signal sequence may be mapped to one or two OFDM symbols depending on a mapping type as shown in FIGS. 18 and 19, and a CDM scheme may be applied to the demodulation reference signal sequence for port multiplexing.

Hereinafter, a DMRS for uplink data and a DMRS for downlink data are divided and described in detail.

Demodulation Reference Signal for PUSCH

A reference signal sequence r(m) for the generation of a downlink DMRS is generated by Equation 23 if transform precoding for an USCH is not permitted.

In this case, as an example of a case where transform precoding for a PUSCH is not permitted, there may be a case where the transmission signal of a CP-OFDM scheme is generated.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 23]}$$

In this case c(i) means a pseudo-random sequence.

If transform precoding for a PUSCH is permitted, a reference signal sequence r(m) is generated by Equation 24.

In this case, as an example of a case where transform precoding for a PUSCH is permitted, there may be a case where the transmission signal of a DFT-S-OFDM scheme is generated.

$$r(m) = e^{-j\frac{\pi qm(m+1)}{L}} \quad \text{[Equation 24]}$$

The DMRS of a generated PUSCH is mapped to a physical resource according to Type 1 or Type 2 given by a higher layer parameter, as shown in FIGS. 18 and 19.

In this case, the DMRS may be mapped to a single symbol or a double symbol depending on the number of antenna ports.

If transform precoding is not permitted, a reference signal sequence r(m) may be mapped to a physical resource according to Equation 25.

$$a_{k,l}^{(p,\mu)} = \beta_{DMRS} w_f(k') \cdot w_t(l') \cdot r(2m + k' + m_0) \quad \text{[Equation 25]}$$

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \bar{l} + l'$$

In Equation 25, 1 is relatively defined at the start of PUSCH transmission, and $w_f(k')$, $w_t(l')$, and $\Delta$ are given by Table 14 and Table 15 below.

Table 14 shows an example of parameters for the DMRS of a PUSCH for Type 1.

TABLE 14

| p | Δ | $w_f(k')$ k'=0 | $w_f(k')$ k'=1 | $w_t(l')$ l'=0 | $w_t(l')$ l'=1 |
|---|---|---|---|---|---|
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

Table 15 shows an example of parameters for the DMRS of a PUSCH for Type 2.

TABLE 15

| p | Δ | $w_f(k')$ k'=0 | $w_f(k')$ k'=1 | $w_t(l')$ l'=0 | $w_t(l')$ l'=1 |
|---|---|---|---|---|---|
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

Table 16 shows an example of a time domain index l' according to a higher layer parameter UL_DMRS_dur and a supported antenna port p.

TABLE 16

| UL_DMRS_dur | l' | p Type 1 | p Type 2 |
|---|---|---|---|
| Single-symbol DMRS | 0 | 1000-1003 | 1000-1005 |
| Double-symbol DMRS | 0, 1 | 1000-1007 | 1000-1011 |

Table 17 shows an example of the starting position $\bar{l}$ of the DMRS of a PUSCH.

TABLE 17

| | $\bar{l}$ | | | |
|---|---|---|---|---|
| | Single symbol DMRS | | Double symbol DMRS | |
| Uplink DMRS parameter | PUSCH mapping type A | PUSCH mapping type B | PUSCH mapping type A | PUSCH mapping type B |
| 0 | $l_0$ | $l_0$ | $l_0$ | $l_0$ |
| 1 | $l_0$, 7 | | | |
| 2 | $l_0$, 9 | | | |
| 3 | $l_0$, 11 | | | |

Demodulation Reference Signals for PDSCH

A reference signal sequence r(m) for generating a downlink DMRS is generated by Equation 26.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 26]}$$

In this case c(i) means a pseudo-random sequence.

The DMRS of a generated PDSCH is mapped to a physical resource according to Type 1 or Type 2 given by a higher layer parameter, as shown in FIGS. 18 and 19.

In this case, a reference signal sequence r(m) may be mapped to a physical resource by Equation 27.

$$a_{k,l}^{(p,\mu)} = \beta_{DMRS} w_f(k') \cdot w_t(l') \cdot r(2m + k' + m_0) \quad \text{[Equation 27]}$$

$$k = \begin{cases} k_0 + 4m + 2k' + \Delta & \text{Configuration type 1} \\ k_0 + 6m + k' + \Delta & \text{Configuration type 2} \end{cases}$$

$$k' = 0, 1$$

$$l = \bar{l} + l'$$

In Equation 27, l is relatively defined at the start of a slot, and $w_f(k')$, $w_t(l')$ and $\Delta$ are given by Table 21 and Table 22.

The time axis index l' and supported antenna ports p are different depending on DL_DMRS_dur that is, a higher layer parameter, in Table 20. The $\bar{l}$ value is different depending on a higher layer parameter DL_DMRS_add_pos given in Table 21 depending on a mapping type:

With respect to the PDSCH mapping type A: if a higher layer parameter DL_DMRS_typeA_pos is equal to 3, $l_0$=3. If not, $l_0$=2.

With respect to the PDSCH mapping type B: $l_0$ is mapped to the first OFDM symbol within a PDSCH resource in which a DMRS has been scheduled.

Table 18 shows an example of parameters for the DMRS configuration type 1 of a PDSCH.

TABLE 18

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

Table 19 shows an example of parameters for the DMRS configuration type 2 of a PDSCH.

TABLE 19

| | | $w_f(k')$ | | $w_t(l')$ | |
|---|---|---|---|---|---|
| p | Δ | k' = 0 | k' = 1 | l' = 0 | l' = 1 |
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |

TABLE 19-continued

| | | $w_f(k')$ | | $w_t(l')$ | |
|---|---|---|---|---|---|
| p | Δ | k' = 0 | k' = 1 | l' = 0 | l' = 1 |
| 1009 | 2 | +1 | −1 | +1 | −1 |
| 1010 | 4 | +1 | +1 | +1 | −1 |
| 1011 | 4 | +1 | −1 | +1 | −1 |

Table 20 shows an example of l', that is, duration of a PDSCH DMRS.

TABLE 20

| | | p | |
|---|---|---|---|
| DL_DMRS_dur | l' | Type 1 | Type 2 |
| Single-symbol DMRS | 0 | 1000-1003 | 1000-1005 |
| Double-symbol DMRS | 0, 1 | 1000-1007 | 1000-1011 |

Table 21 shows an example of the starting position $\bar{l}$ of the DMRS of a PDSCH.

TABLE 21

| | $\bar{l}$ | | | |
|---|---|---|---|---|
| | Single symbol DMRS | | Double symbol DMRS | |
| Downlink DMRS parameter | PDSCH mapping type A | PDSCH mapping type B | PDSCH mapping type A | PDSCH mapping type B |
| 0 | $l_0$ | $l_0$ | $l_0$ | $l_0$ |
| 1 | $l_0$, 7 | | | |
| 2 | $l_0$, 9 | | | |
| 3 | $l_0$, 11 | | | |

Figure 20:
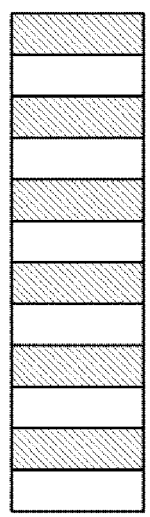
FIG. 20 is a diagram showing an example of a DMRS port indexing method proposed in this specification.
Figure 20:
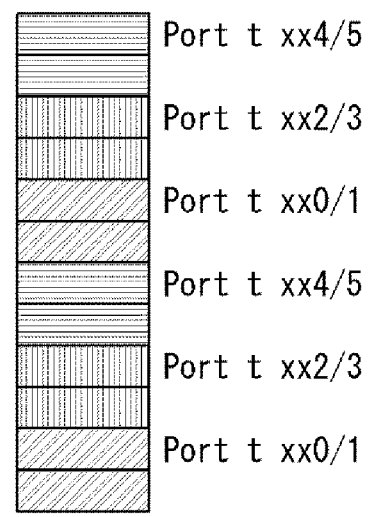

FIG. 20 is a diagram showing an example of a DMRS port indexing method proposed in this specification.

As shown in FIG. 20, DMRS port indexing may be different depending on the mapping type of a DMRS.

Specifically, if the mapping type of a DMRS is the above-described type 1, DMRS port indexing is given like FIG. 20(*a*) and Table 22.

TABLE 22

| Port indexing | Frequency offset: delta | FD-OCC | |
|---|---|---|---|
| XX0 | 0 | +1 | +1 |
| XX1 | 0 | +1 | −1 |
| XX2 | 1 | +1 | +1 |
| XX3 | 0 | +1 | −1 |

If the mapping type of a DMRS is the above-described type 2, DMRS port indexing is given like FIG. 20(*b*) and Table 23.

TABLE 23

| Port indexing | Frequency offset: delta | FD-OCC | |
|---|---|---|---|
| XX0 | 0 | +1 | +1 |
| XX1 | 0 | +1 | −1 |
| XX2 | 2 | +1 | +1 |
| XX3 | 2 | +1 | −1 |

TABLE 23-continued

| Port indexing | Frequency offset: delta | | FD-OCC |
|---|---|---|---|
| XX4 | 4 | +1 | +1 |
| XX5 | 4 | +1 | −1 |

As described in FIGS. 18 and 19, if a DMRS is configured in an OFDM symbol unit, there may be a problem in channel compensation if the DMRS is configured in a symbol on the front side among symbols for fast decoding speed.

That is, in the case of a high Doppler environment, it is difficult to perform proper channel compensation using only a DMRS configured in a symbol on the front side because a channel change is great within one slot (or subframe).

Accordingly, in order to overcome such a problem, a channel may be compensated by configuring a DMRS in an OFDM symbol on the rear side.

Hereinafter, in this present invention, a basically configured DMRS is called a first DMRS or front-loaded DMRS and an additionally configured DMRS is called a second DMRS or additional DMRS.

Figure 21:
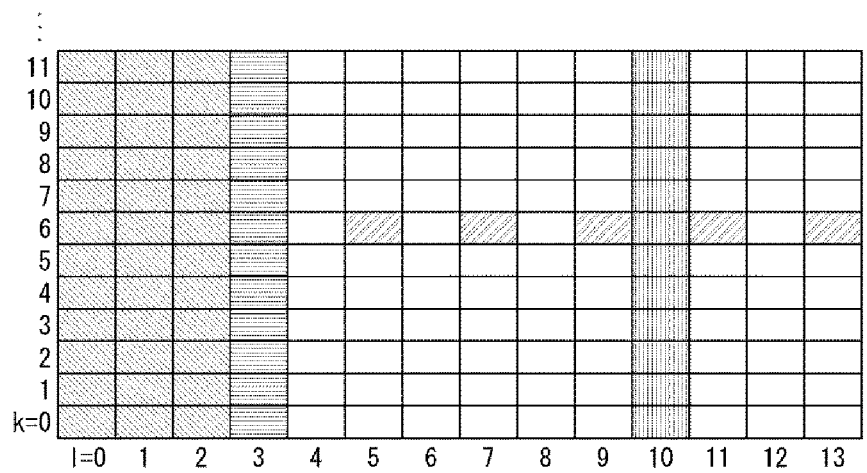
FIG. 21 is a diagram showing an example of a method for mapping a PTRS proposed in this specification.
Figure 21:
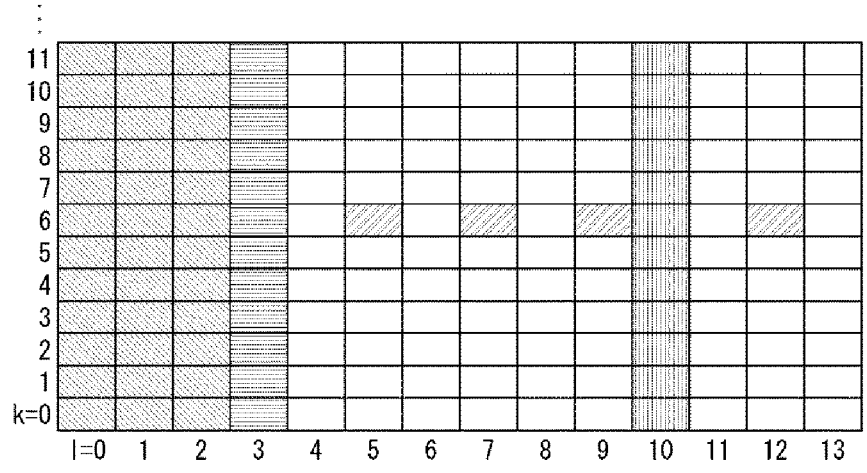
Figure 21:
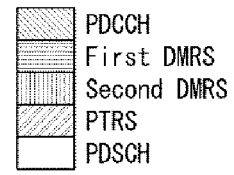

FIG. 21 is a diagram showing an example of a method for mapping a PTRS proposed in this specification.

Referring to FIG. 21, a PTRS may be mapped to an OFDM symbol based on at least one of a PDSCH (or PUSCH) or a DMRS.

Specifically, if a PTRS is mapped in a CP-OFDM and DFT-s-OFDM, the PTRS may start to be mapped every specific symbol from the first symbol including the PDSCH or PUSCH of a slot.

In this case, if a symbol to the DMRS is mapped is present, as shown in FIG. 21(a), the PTRS may be mapped to each specific symbol based on a symbol to which a first DMRS is mapped. For example, a PTRS may be mapped to every one, two or four symbols based on the symbol to which a first DMRS is mapped.

If two symbols to which the first DMRS is mapped neighbor, a PTRS may be mapped to every specific symbol based on one of the two symbols to which the first DMRS has been mapped.

If a second DMRS is mapped in addition to a first DMRS, phase rotation may be estimated using the second DMRS in a symbol to which the second DMRS is mapped. Accordingly, a PTRS may not be mapped to a resource element of the symbol to which the second DMRS is mapped.

A PTRS may be mapped to every specific symbol based on an OFDM symbol to which the closest DMRS positioned ahead of the index of an OFDM symbol to which the PTRS is mapped is mapped.

For example, as shown in FIG. 21(b), if a symbol to which a first DMRS or a second DMRS is mapped is present ahead of an OFDM symbol in which a PTRS is defined, the PTRM may be mapped to every two symbols based on the closest symbol among symbols to which the first DMRS or the second DMRS is mapped.

That is, the PTRS may be mapped to every two symbols based on the symbol to which the first DMRS has been mapped up to a symbol prior to the symbol to which the second DMRS has been mapped from the symbol to which the first DMRS has been mapped. A PTRS may be mapped to every two symbols based on the symbol to which the second DMRS has been mapped after the symbol to which the second DMRS has been mapped.

In another embodiment of the present invention, whether a PTRS is transmitted may be determined based on the number of OFDM symbols to which a second DMRS is mapped.

For example, when a user equipment moves at fast speed, a second DMRS may be mapped to a plurality of OFDM symbols.

In this case, the influence of a Doppler may be dominant over the influence of phase noise with respect to channel estimation performance due to a time-varying phenomenon of a channel in which the channel is rapidly changed. Phase noise may not have a great influence on channel estimation performance.

Furthermore, a user equipment may apply a 2D filter or an interpolation scheme in the time domain in order to improve channel estimation performance. However, if channel estimation performance is improved using the 2D filter or the interpolation scheme in the time domain, there may be a difficulty in properly applying a CPE value, estimated using a PTRS, to a channel compensation process.

Accordingly, a user equipment may estimate a channel by compensating for a Doppler effect through a DMRS without transmitting a PTRS. In this case, there is an effect in that RS overhead can be reduced because a PTRS is not transmitted.

In this case, a base station may not transmit a PTRS when the number of OFDM symbols to which a first DMRS and a second DMRS have been mapped is a specific number or more.

A self-contained subframe may not use the 2D filter or the interpolation scheme in the time domain. In such a case, the transmission of a PTRS may be necessary.

An embodiment in which a PTRS is not transmitted may be applied to a non-self-contained subframe only.

A base station may transmit and receive information related to whether a PTRS is transmitted and a mapping pattern to and from a user equipment.

Specifically, a base station may configure whether to map a PTRS through a semi-static method. That is, the base station may transmit higher layer signaling, indicating whether to map a PTRS, to a user equipment. The user equipment may recognize that whether a PTRS is mapped to an OFDM symbol through the higher layer signaling transmitted by the base station.

For example, if a base station configures that a PTRS may be mapped to an OFDM symbol with respect to a user equipment through higher layer signaling, whether a PTRS is actually transmitted and a mapping pattern may be determined according to a specific rule to be described below. In contrast, if a base station configures that a PTRS is not mapped to an OFDM symbol with respect to a user equipment through higher layer signaling, it may be assumed that a PTRS is not actually transmitted regardless of a specific rule to be described later.

If a PTRS is mapped to an OFDM symbol, the PTRS may be mapped to the OFDM symbol according to the following PTRS configuration method.

That is, if higher layer signaling indicates that a PTRS is mapped to an OFDM symbol, the PTRS may be mapped based on a specific pattern in the time axis and frequency axis according to a specific rule as below.

Time-axis mapping pattern: whether a PTRS is transmitted and a time-axis mapping pattern may be dynamically configured according to a modulation and coding scheme (MCS) dynamically configured in a user equipment.

For example, if an MCS (e.g., QPSK) having a very low modulation order is configured in a user equipment, a PTRS may not be mapped. If an MCS (e.g., 16QAM) having a relatively low modulation order is configured in a user equipment, a PTRS may be configured as a mapping pattern (e.g., 4 symbol unit) having low time axis density.

However, if an MCS (e.g., 64QAM, 256QAM) having a high modulation order is configured in a user equipment, a PTRS may be configured as a mapping pattern (e.g., 2 symbol unit or every symbol unit) having high time axis density.

Frequency-axis mapping pattern: the frequency-axis mapping pattern of a PTRS and whether a PTRS is transmitted may be configured based on a scheduled bandwidth (BW) dynamically configured in a user equipment. For example, if a very small scheduling BW is configured in a user equipment, a PTRS may not be transmitted to the user equipment. If a small scheduling BW is configured in a user equipment, a PTRS may be configured as a mapping pattern having low frequency axis density in order to reduce RS overhead.

That is, as a scheduling BW configured in a user equipment increases, the mapping pattern of a PTRS may be configured to have higher density in the frequency axis.

A base station may configure, in a user equipment, at least one of an indicator indicating whether a PTRS is transmitted, an MCS to determine the time-axis mapping pattern of the PTRS, or a scheduling BW for determining a frequency-axis mapping pattern through higher layer signaling.

In addition to the above-described PTRS configuration method, the rule by which whether a PTRS is transmitted is determined based on the number of OFDM symbols to which a second DMRS is mapped may be additionally defined between a base station and a user equipment.

A base station may indicate whether a PTRS is mapped with respect to a user equipment through higher layer signaling based on the above-described semi-static method, and may configure whether a PTRS is transmitted, a time-axis mapping pattern and a frequency axis mapping pattern with respect to a user equipment according to a specific rule.

Furthermore, in order for whether a PTRS is transmitted to be determined based on the time axis density of a second DMRS, a base station may configure a given rule along with a user equipment, and may configure whether a PTRS is mapped based on the number of OFDM symbols to which the second DMRS is mapped.

In this case, whether to apply the number of OFDM symbols to which the second DMRS is mapped for determining whether a PTRS is transmitted and an additional rule to determine whether a PTRS is transmitted based on the number of OFDM symbols to which the second DMRS is mapped may be configured from a base station to a user equipment through higher layer signaling and/or DCI signaling.

Alternatively, a base station and a user equipment may be per-configured to operate according to a given rule and/or an additional rule, and may perform an operation related to the transmission of a PTRS without explicit signaling.

For example, if the number of OFDM symbols to which a second DMRS is mapped, for determining whether a PTRS is transmitted, is defined as "3" and the number of OFDM symbols to which a second DMRS is mapped, configured in a user equipment, is "3" or more, the PTRS is not mapped according to the above-described PTRS configuration method, but may be configured to be not transmitted.

In this case, when a second DMRS is mapped to two OFDM symbols or less, a PTRS is configured by the above-described PTRS configuration method. When a second DMRS is mapped to three OFDM symbols or more, a PTRS is not mapped by the above-described a PTRS configuration method and is not transmitted.

Figure 22:
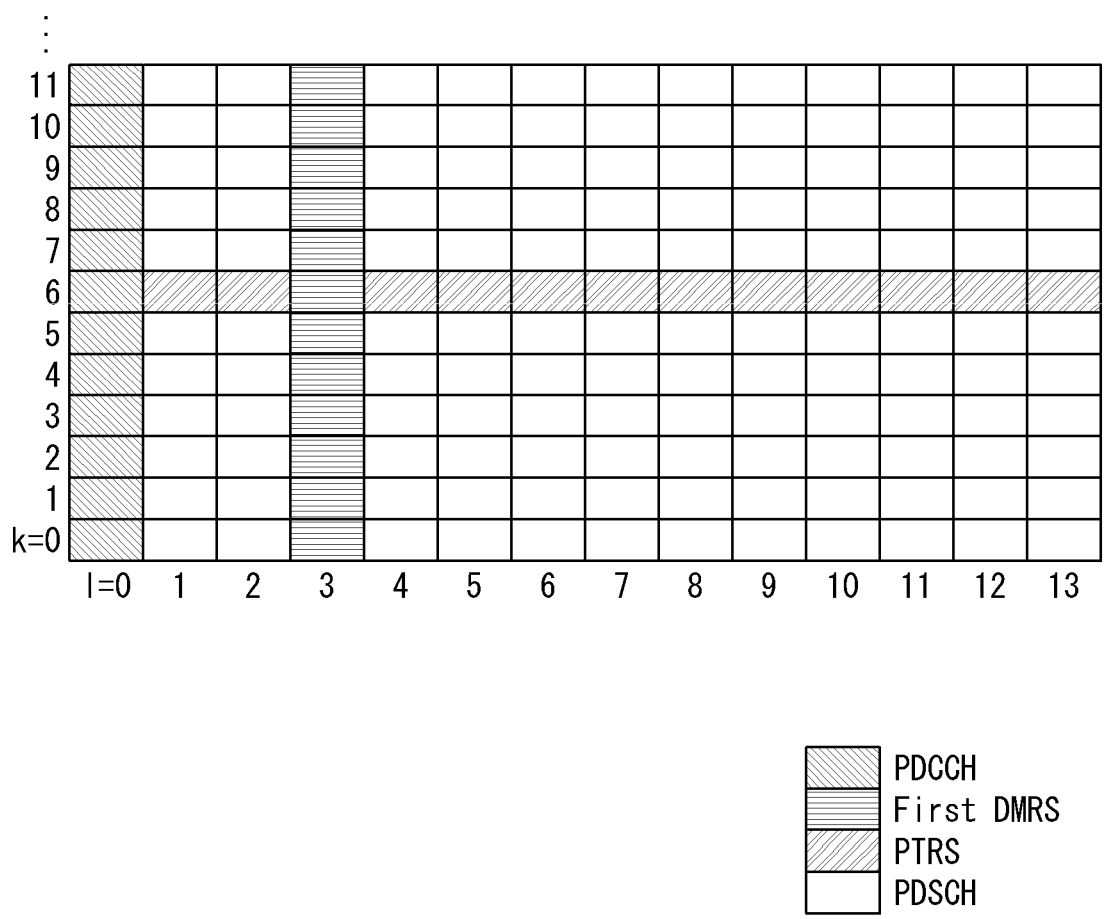
FIGS. 22 to 24 are diagrams showing other examples of a method for mapping a PTRS proposed in this specification.
Figure 23:
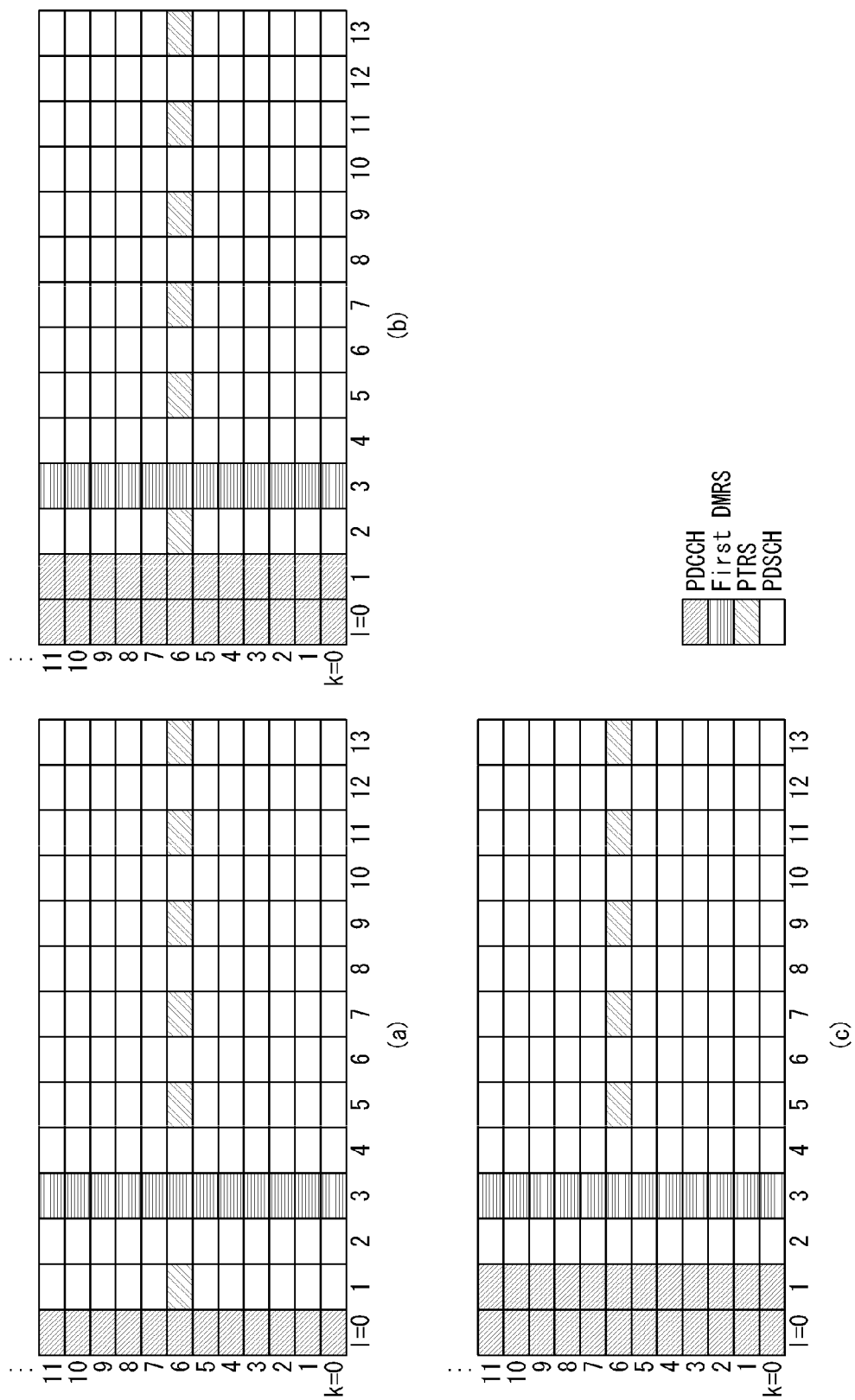
Figure 24:
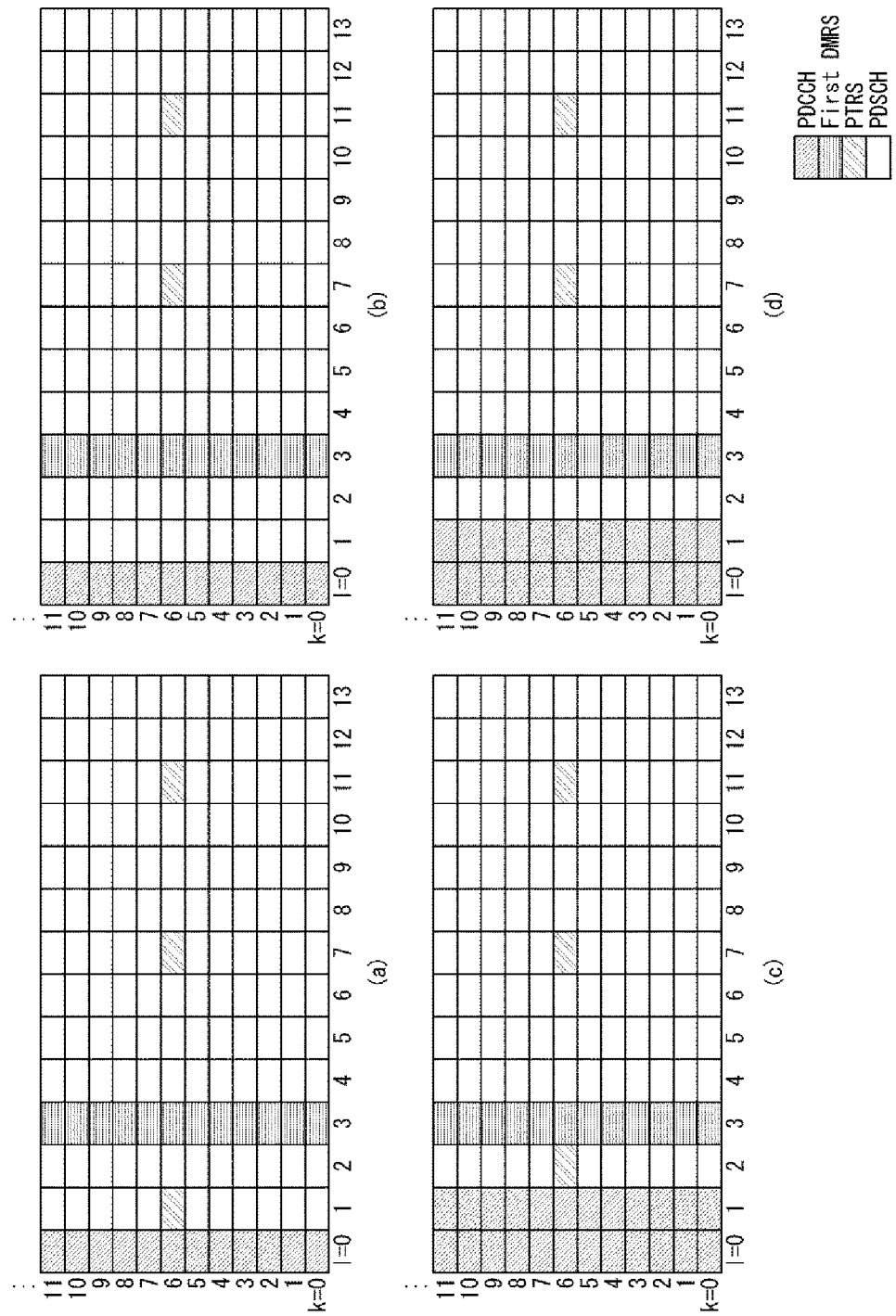

FIGS. 22 to 24 are diagrams showing other examples of a method for mapping a PTRS proposed in this specification.

Referring to FIGS. 22 to 24, if the first symbol of OFDM symbols to which a PDSCH (or PUSCH) has been mapped is positioned ahead of an OFDM symbol to which a first DMRS has been mapped, a PTRS may be mapped based on the first symbol of the OFDM symbols to which the PDSCH (or PUSCH) has been mapped or the OFDM symbol to which the first DMRS has been mapped.

Specifically, when the first symbol of OFDM symbols to which a PDSCH (or PUSCH) has been mapped is positioned ahead of an OFDM symbol to which a first DMRS has been mapped, a PTRS may be mapped based on the first symbol of the OFDM symbols to which the PDSCH (or PUSCH) has been mapped.

For example, as shown in, FIG. 22, if OFDM symbols to which a PDSCH is mapped are positioned ahead of an OFDM symbol to which a first DMRS is mapped, a PTRS may start to be mapped at given symbol intervals from the first OFDM symbol of the OFDM symbols to which the PDSCH is mapped, which are positioned ahead of the OFDM symbol to which the first DMRS is mapped.

FIG. 22 shows an example of a case where a PTRS is mapped every symbol.

Alternatively, when the first symbol of OFDM symbols to which a PDSCH (or PUSCH) has been mapped is positioned ahead of an OFDM symbol to which a first DMRS has been mapped, a PTRS may start to be mapped at given symbol intervals from an OFDM symbol behind the OFDM symbol to which the first DMRS has been mapped.

In this case, a symbol interval between OFDM symbols to which the PTRS is mapped may be configured based on the position of the first OFDM symbol to which the first DMRS is mapped according to the time-axis mapping pattern of the PTRS.

For example, if a PTRS is mapped at intervals of two symbols, as shown in FIGS. 23(a) and 23(b), the PTRS may be defined at the starting position of a PDSCH. If the interval between the starting position of the PDSCH and a first DMRS position is a specific number of symbols or less (e.g., 1 symbol or less), a PTRS may not be configured between the starting position of the PDSCH and the first DMRS position as shown in FIG. 23(c).

FIGS. 24(a) to 24(d) show examples of a case where a PTRS is mapped at intervals of four symbols.

As shown in FIGS. 24(a) and 24(c), when OFDM symbols to which a PDSCH is mapped are positioned ahead of an OFDM symbol to which a first DMRS is mapped, a PTRS may be mapped from the first OFDM symbol of the OFDM symbols to which the PDSCH is mapped, which are positioned ahead of the OFDM symbol to which the first DMRS is mapped.

In this case, if the interval between the OFDM symbols to which the PDSCH is mapped, positioned ahead of the OFDM symbol to which the first DMRS is mapped, is a specific number of symbols or less, the PTRS may not be configured between the OFDM symbol to which the first DMRS is mapped and the OFDM symbol to which the PDSCH is mapped.

For example, as shown in FIGS. 24(b) and 24(d), when the symbol interval between a PDSCH and a first DMRS is 2 symbols or 1 symbol or less, a PTRS may not be configured between the PDSCH and the first DMRS.

Alternatively, if a PTRS is configured at 4 symbol intervals, a PTRS may not be mapped to symbols prior to an OFDM symbol to which a first DMRS is mapped.

A user equipment may receive downlink data, a DMRS and a PTRS mapped based on a specific pattern as described above through one subframe.

The user equipment may estimate a channel in which the downlink data is transmitted using the DMRS and the PTRS in order to detect the receive downlink data.

Specifically, the user equipment may estimate a channel value necessary for channel compensation using the received DMRS, and may estimate a phase difference between the channel, estimated through the DMRS, and an actual channel using the PTRS.

Thereafter, the user equipment estimates an actual channel value using the channel value estimated using the DMRS and the phase difference estimated using the PTRS, and compensates for a channel with respect to the received downlink data using the estimated channel value.

Thereafter, the user equipment detects the downlink data, transmitted by a base station, by performing a demodulation and decoding process.

Figure 25:
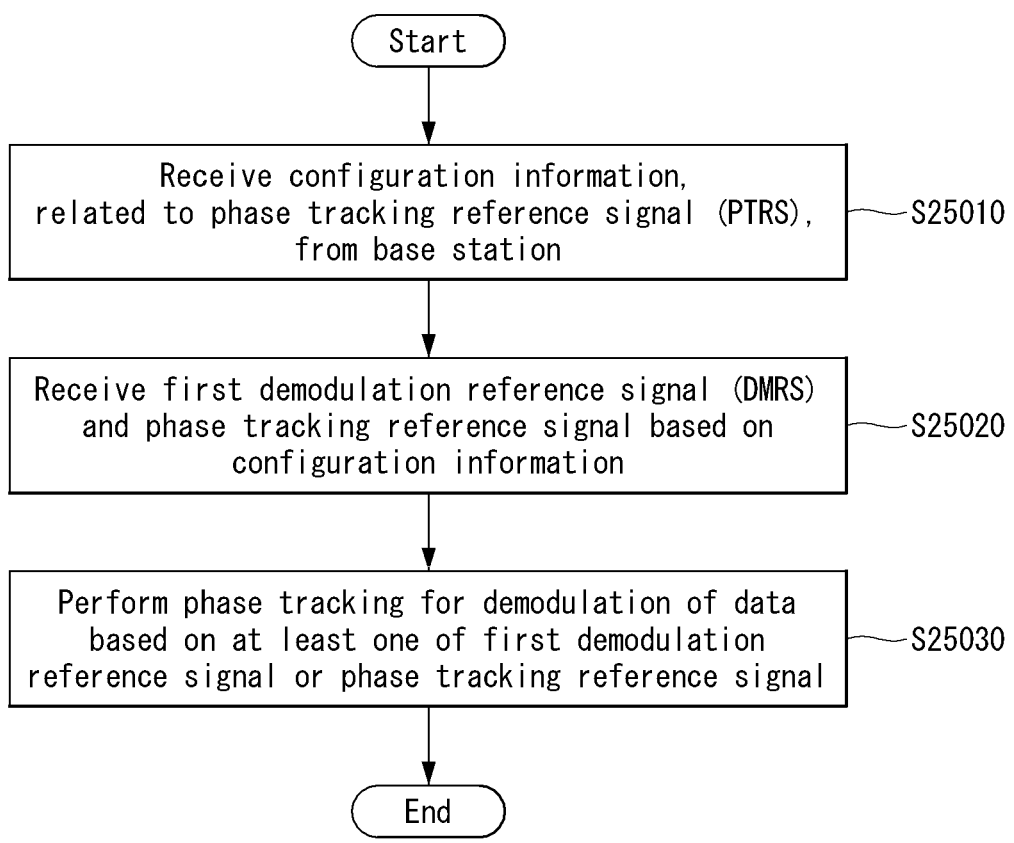
FIG. 25 is a flowchart illustrating an example of a method of receiving a PTRS by a user equipment and performing phase tracking, which is proposed in this specification.

FIG. 25 is a flowchart illustrating an example of a method of receiving a PTRS by a user equipment and performing phase tracking, which is proposed in this specification.

Referring to FIG. 25, a user equipment receives configuration information, related to a phase tracking reference signal (PTRS), from a base station (S25010).

In this case, the configuration information may include an indicator indicating whether a PTRS is mapped, first pattern information related to the time-axis mapping pattern of the PTRS, or second pattern information related to the frequency axis mapping pattern of the PTRS, as described in FIGS. 21 to 24.

The first pattern information may directly indicate the time-axis mapping pattern of the PTRS, but may implicitly indicate MCS information for enabling the user equipment to recognize the time-axis mapping pattern of the PTRS as described above.

Furthermore, the second pattern information may directly indicate the frequency-axis mapping pattern of the PTRS, but may implicitly indicate scheduled bandwidth information for enabling the user equipment to recognize the frequency-axis mapping pattern of the PTRS as described above.

Thereafter, the user equipment receives a first demodulation reference signal (DMRS) and a phase tracking reference signal based on the received configuration information (S25020).

The phase tracking reference signal may be mapped to at least one OFDM symbol at given symbol intervals according to a specific pattern, as described in FIGS. 21 to 24.

Thereafter, the user equipment may demodulate and decode the received data by performing the phase tracking for the demodulation of data based on at least one of the first demodulation reference signal or the phase tracking reference signal (S25030).

Figure 26:
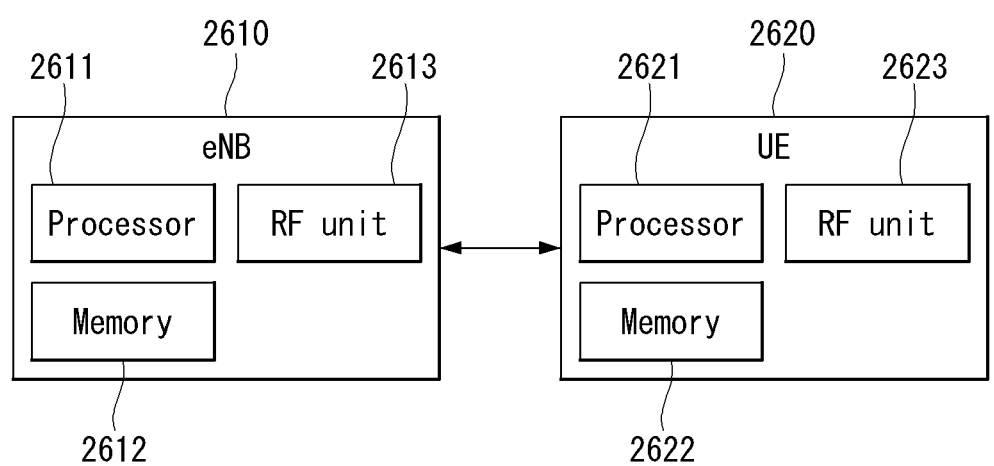
FIG. 26 is a diagram showing an example of the internal block diagram of a wireless device to which the present invention may be applied.

FIG. 26 is a diagram showing an example of the internal block diagram of a wireless device to which the present invention may be applied.

In this case, the wireless device may be a eNB and a user equipment, and the eNB includes both a macro eNB and a small eNB.

As shown in FIG. 26, the eNB 2610 and the UE 2620 include communication units (or transmission/reception units or radio-frequency (RF) units) 2613 and 2623, processors 2611 and 2621, and memory 2612 and 2622, respectively.

In addition, each of the eNB and the UE may further include an input unit and an output unit.

The communication unit 2613, 2623, the processor 2611, 2621, the input unit, the output unit, and the memory 2612, 2622 are functionally coupled in order to perform the methods proposed in this specification.

When receiving information produced by a physical layer (PHY) protocol, the communication unit (or the transmission/reception unit or the RF unit) 2613, 2623 moves the received information to an RF spectrum, performs filtering and amplification on the information, and sends the signal to an antenna. Furthermore, the communication unit moves the RF signal, received from the antenna, to a band that may be processed in the PHY protocol and performs filtering on the RF signal.

Furthermore, the communication unit may have a switch function for changing such transmission and reception functions.

The processor 2611, 2621 implements the functions, processes and/or methods proposed in this specification. The layers of a radio interface protocol may be implemented by the processor.

The processor may be represented as a control unit, controller, control unit, or computer.

The memory 2612, 2622 is connected to the processor 2611, 2621 and stores protocols or parameters for performing an uplink resource allocation method.

The processor 2611, 2621 may include application-specific integrated circuits (ASICs), other chipsets, logic circuits and/or data processing devices. The memory may include read-only memory (ROM), random access memory (RAM), flash memory, a memory card, a storage medium and/or other storage devices. The communication unit may include baseband circuits for processing radio signals. When an embodiment is implemented in software, the method may be implemented as a module process or function for performing the functions.

The module may be stored in the memory and may be executed by the processor. The memory may be positioned inside or outside the processor and may be connected to the processor by well-known means.

The output unit (or display unit or indication unit) is controlled by the processor and outputs information output by the processor along with a key entry signal generated from a key input unit and various information signals from the processor.

Furthermore, the drawings have been divided and described for convenience of description, but the embodiments described with reference to the drawings may be merged to implement a new embodiment(s). Furthermore, the scope of the present invention also includes designing a computer-readable recording medium in which a program for executing the above-described embodiments has been written according to the needs of those skilled in the art.

The method for transmitting and receiving reference signals according to this specification is not limitedly applied to the configurations and methods of the aforementioned embodiments, but some or all of the embodiments may be selectively combined and configured so that the embodiments are modified in various ways.

Meanwhile, the method for transmitting and receiving reference signals according to this specification may be implemented in a recording medium, readable by a processor included in a network device, in the form of code readable by the processor. The processor-readable recording medium includes all types of recording devices in which data readable by a processor is stored. The processor-readable recording medium may include ROM, RAM, CD-ROM, magnetic tapes, floppy disks, and optical data storages, for example. Furthermore, the processor-readable recording medium may be implemented in the form of carrier waves, such as transmission over the Internet. Furthermore, the processor-readable recording medium may be distributed to computer systems connected over a network, and code readable by a processor may be stored in the processor-readable recording medium and executed in a distributed manner.

Furthermore, although the preferred embodiments of this specification have been illustrated and described above, this specification is not limited to the above-described specific embodiments, and a person having ordinary skill in the art to which the present invention pertains may modify the present invention in various ways without departing from the gist of the present invention in the claims. Such modified embodiments should not be individually understood from the technical spirit or prospect of the present invention.

Furthermore, in this specification, both the apparatus invention and the method invention have been described, but the descriptions of both the inventions may be complementary applied, if necessary.

INDUSTRIAL APPLICABILITY

The RRC connection method in a wireless communication system of the present invention has been illustrated as being applied to the 3GPP LTE/LTE-A system, but may be applied to various wireless communication systems in addition to the 3GPP LTE/LTE-A system.

The invention claimed is:

1. A method of performing phase tracking by a user equipment in a wireless communication system, the method comprising:
receiving a first demodulation reference signal (DMRS) and a phase tracking reference signal (PTRS) from a base station,
wherein the phase tracking reference signal is mapped to at least one OFDM symbol at constant symbol intervals on a time axis according to a specific pattern; and
performing the phase tracking for demodulation of data based on at least one of the first demodulation reference signal or the phase tracking reference signal,
wherein the PTRS is mapped to symbols between the first OFDM symbol and the second OFDM symbols with reference to the first OFDM symbol and mapped to symbols after the second OFDM symbol with reference to the second OFDM symbol, when a first OFDM symbol with the first DMRS mapped thereto is positioned ahead of a second OFDM symbol with a second DMRS mapped thereto on the time axis.

2. The method of claim 1,
wherein the phase tracking reference signal is mapped based on first priority OFDM symbol among a plurality of OFDM symbols in which the data is transmitted.

3. The method of claim 1,
wherein when the first demodulation reference signal is mapped to two OFDM symbols, the phase tracking reference signal is mapped based on one of the two OFDM symbols.

4. The method of claim 1,
wherein when a second demodulation reference signal is mapped to an OFDM symbol, the phase tracking reference signal is mapped to an OFDM symbol except an OFDM symbol to which the second demodulation reference signal has been mapped among the at least one OFDM symbol.

5. The method of claim 4,
wherein when the second demodulation reference signal is mapped to a specific number of OFDM symbols or less, the phase tracking reference signal is mapped to the at least one OFDM symbol.

6. The method of claim 1,
wherein when a first OFDM symbol to which the data is mapped is positioned ahead of a second OFDM symbol to which the first demodulation reference signal is mapped, the phase tracking reference signal is mapped to an OFDM symbol after the second OFDM symbol among the at least one OFDM symbol.

7. A user equipment performing phase tracking in a wireless communication system, the user equipment comprising:
a communication unit transmitting and receiving radio signals to and from an outside; and
a processor functionally coupled to the communication unit,
wherein the processor is configured to:
receive a first demodulation reference signal (DMRS) and a phase tracking reference signal (PTRS) from a base station,
wherein the phase tracking reference signal is mapped to at least one OFDM symbol at constant symbol intervals based on a specific pattern; and
perform the phase tracking for demodulation of data based on at least one of the first demodulation reference signal or the phase tracking reference signal,
wherein the PTRS is mapped to symbols between the first OFDM symbol and the second OFDM symbols with reference to the first OFDM symbol and mapped to symbols after the second OFDM symbol with reference to the second OFDM symbol, when a first OFDM symbol with the first DMRS mapped thereto is positioned ahead of a second OFDM symbol with a second DMRS mapped thereto on the time axis.

8. The user equipment of claim 7,
wherein the phase tracking reference signal is mapped based on first priority OFDM symbol among a plurality of OFDM symbols in which the data is transmitted.

9. The user equipment of claim 7,
wherein when the first demodulation reference signal is mapped to two OFDM symbols, the phase tracking reference signal is mapped based on one of the two OFDM symbols.

10. The user equipment of claim 7,
wherein when a second demodulation reference signal is mapped to an OFDM symbol, the phase tracking reference signal is mapped to an OFDM symbol except an OFDM symbol to which the second demodulation reference signal has been mapped among the at least one OFDM symbol.

11. The user equipment of claim 10,
wherein when the second demodulation reference signal is mapped to a specific number of OFDM symbols or less, the phase tracking reference signal is mapped to the at least one OFDM symbol.

12. The user equipment of claim 7,
wherein when a first OFDM symbol to which the data is mapped is positioned ahead of a second symbol to which the first demodulation reference signal is mapped, the phase tracking reference signal is mapped based on the first OFDM symbol.

13. The user equipment of claim 7,
wherein when a first OFDM symbol to which the data is mapped is positioned ahead of a second OFDM symbol to which the first demodulation reference signal is mapped, the phase tracking reference signal is mapped to an OFDM symbol after the second OFDM symbol among the at least one OFDM symbol.

* * * * *

UNITED STATES PATENT AND TRADEMARK OFFICE
CERTIFICATE OF CORRECTION

PATENT NO. : 10,917,280 B2
APPLICATION NO. : 16/064398
DATED : February 9, 2021
INVENTOR(S) : Kyuseok Kim et al.

Page 1 of 1

It is certified that error appears in the above-identified patent and that said Letters Patent is hereby corrected as shown below:

In the Claims

In Column 53, Line 44, in Claim 1, after symbols between, delete "the" and insert --a--;

In Column 53, Line 45, in Claim 1, after OFDM symbol and, delete "the" and insert --a--;

In Column 53, Line 45, in Claim 1, after second OFDM, delete "symbols" and insert --symbol--;

In Column 54, Line 29, in Claim 7, after symbols between, delete "the" and insert --a--;

In Column 54, Line 30, in Claim 7, after OFDM symbol, delete "the" and insert --a--.

Signed and Sealed this
Sixth Day of December, 2022

Katherine Kelly Vidal
*Director of the United States Patent and Trademark Office*